(12) United States Patent
Liao

(10) Patent No.: US 6,691,171 B1
(45) Date of Patent: Feb. 10, 2004

(54) METHOD AND SYSTEM FOR ADDRESS LOOKUP IN DATA COMMUNICATION

(75) Inventor: Ting-Ko Liao, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 119 days.

(21) Appl. No.: 10/061,089

(22) Filed: Feb. 1, 2002

(51) Int. Cl.[7] .............................................. G06F 15/16
(52) U.S. Cl. ...................................................... 709/245
(58) Field of Search ......................................... 709/245

(56) References Cited

PUBLICATIONS

Sahni, S.; "Data Structures, Algorithms, & Applications in Java Tries", 1999 retrieved from the Internet on Mar. 3, 2001.*

"The Trie Data Structure" Feb. 14, 2000, retrieved from the Internet.*

Degermark, M.; Brodnik, A.; Carlsson, S.; Pink, S.; "Small Forwarding Tables for Fast Routing Lookups", Computer Communication Review, vol. 27, No. 4, pp. 3–14, Oct. 1997, USA.

Filippi, E.; Innocenti, V.; Vercellone, V.; "Address Lookup Solutions for Gigabit Switch/Router"; CSELT Technical Reports, vol. 27, No. 3, pp. 417–432, Jun. 1999, Italy.

Gupta, P.; Lin, S.; McKeown, N.; "Routing Lookups in Hardware at Memory Access Speeds"; Proceedings IEEE INFOCOM'98 Conference on Computer Communications Seventeenth Anual Joint Conference of the IEEE Computer and Communications Societies Gateway to the 21st Century; Mar. 29 to Apr. 2, 1998, San Francisco, CA, USA.

Gupta, P.; "Algorithms for Routing Lookups and Packet Classification", vol. 62/01–B of Dissertation Abstracts International, p. 333–, Dec. 2000, USA.

(List continued on next page.)

Primary Examiner—Frantz B. Jean
(74) Attorney, Agent, or Firm—Fenwick & West LLP

(57) ABSTRACT

A system and method searches for a longest prefix match for an address having a number of binary bits among a plurality of entries having different lengths of bits. The entries are associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers. Each of the entries corresponds to one trie node, and at least one trie node for L-bit trie match points to the first trie unit. Each trie node corresponds to a first, second, third, or fourth type of trie node. The method of searching first splits the address into at least a first key and a second key, each key including a predetermined number of address bits. Then, it determines a first matching node among the first number of trie nodes based on the address bits in the first key. Responsive to the first matching node corresponding to the first or second trie node type, the method selects the entry corresponding to the first matching node as the longest prefix match for the address. Also, responsive to the first matching node corresponding to the third or fourth trie node type, the method determines at least one second matching node in the first trie unit based upon the address bits in the second key.

22 Claims, 21 Drawing Sheets

OTHER PUBLICATIONS

Keshav, S.; Sharma, S.; "Issue and Trensa in Router Design"; IEEE Communications Magazine, vol. 36, No. 5, pp. 144–151, May 1998, USA.

Nilsson, S.; Karlsson, G.; "Fast Address Lookup for Internet Routers"; Proceedings of the 4$^{th}$ Interantional Conference on Broadband Communications, Apr. 1–3, 1998, Germany.

Sahni, S.; "Data Structures, Algorithms, & Applications in Java Tries, " [online], 1999, [retrieved on Mar. 3, 2001]; retrieved from the Internet: <URL: http://www.cise.ufl.edu/~ sahni/dsaaj/enrich/c16/tries.htm>.

Srinivasan, V.; Varghese, G.; "Faster IP Lookups Using Controlled Prefix Expansion"; Proceedings of the 1998 Joint International Conference on Measurement and Modeling of Computer Systems, SYGMETRICS'98/PERFORMANCE '98; Jun. 1998, USA.

"The Trie Data Structure," [online], Feb. 14, 2000, [retrieved on Oct. 3, 2001]; retrieved from the Internet: <URL: http://www.webconference.com/js/column57/2.html>.

* cited by examiner

Prior Art

Prior Art

FIGURE 2B
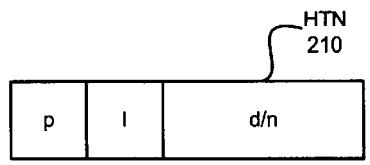
FIGURE 2C
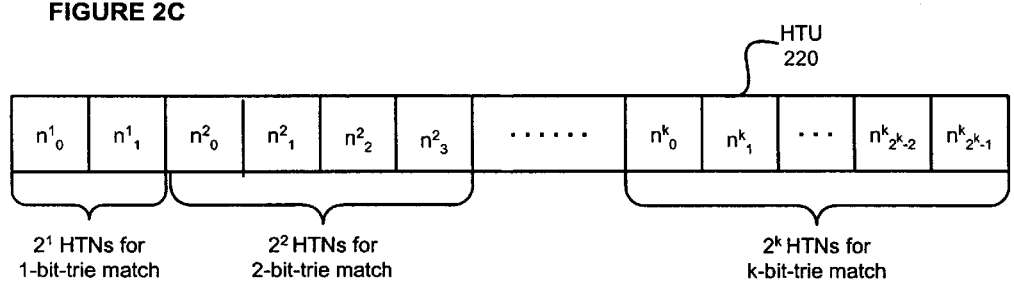
FIGURE 2D
| key [0] | key [1] | key [2] | ...... | key [N] |
|---------|---------|---------|--------|---------|
| bit[0:L-1] | bit[L:L+k-1] | bit[L+k:L+2k-1] | ...... | bit[L+(N-1)k:M-1] |

FIGURE 4B

| $p^1$ | $p^2$ | $p^3$ | $p^4$ | ......... | $p^{k-1}$ | $p^k$ | Destination Pointer Selector | Search Done Indicator |
|---|---|---|---|---|---|---|---|---|
| 0 | x | x | x | ......... | x | x | 1 | 1 |
| 1 | 0 | x | x | ......... | x | x | 2 | 1 |
| 1 | 1 | 0 | x | ......... | x | x | 3 | 1 |
| 1 | 1 | 1 | 0 | ......... | x | x | 4 | 1 |
| . | . | . | . | . | . | . | . | . |
| . | . | . | . | . | . | . | . | . |
| . | . | . | . | . | . | . | . | . |
| 1 | 1 | 1 | 1 | ......... | 0 | x | k-1 | 1 |
| 1 | 1 | 1 | 1 | ......... | 1 | 0 | k | 1 |
| 1 | 1 | 1 | 1 | ......... | 1 | 1 | k | 0 |

METHOD AND SYSTEM FOR ADDRESS LOOKUP IN DATA COMMUNICATION

TECHNICAL FIELD

This invention relates to the technologies of digital data communication, digital pattern recognition, digital sorting and search processing, data compression processing and wire speed Internet network routing.

BACKGROUND OF THE INVENTION

The Internet currently has a few tens of backbone routers, each serving up to a few thousand smaller enterprise networks. The major performance bottleneck in backbone routers is the time taken to look up a route in a forwarding table. On receiving a data packet, an input port looks up the packet's destination address in its forwarding table to determine the packet's destination port. Since the forwarding table may contain a large number of routing entries, it is time consuming to match an incoming packet with these routing entries. Furthermore, to reduce database size and routing update traffic, the forwarding table typically contains a smaller set of prefixes, instead of all of the assigned Internet addresses. This requires a more complex lookup because an incoming packet may match multiple routing entries and the entry with the longest prefix match needs to be determined.

Prefixes are patterns that match the first n binary bits of a destination address, where n is a positive integer. The forwarding table stores routing entries that are typically of the form <network address/mask, port>, where "mask" is a number that specifies the first number of bits in the "network address" as the prefix to be matched for "port," which identifies a specific destination port. The speed of a route lookup is determined by the number of memory access required to find the matching route entry, and by the speed of the memory. Data structures for the route entries in the forwarding table can be designed to reduce lookup time. A second consideration in designing forwarding table data structures is the time taken for table updates, such as prefix insertion, deletion, route change, and the like. Since a forwarding table may need to be updated relatively less frequently, conventional forwarding table data structures and address matching algorithms are usually designed to optimize route lookup at the expense of the time taken to update the table.

A common type of data structure for the forwarding table is a trie. The trie is a general-purpose data structure for storing strings, where each string is represented by a leaf in a tree structure and the value of the string corresponds to the path from the root of the tree to the leaf. A basic trie structure 101 for a set of binary strings (P1, P2, P3, P4, P5, P6, P7, and P8) is shown in FIG. 1A. This simple structure is not very efficient. The number of nodes ($N_1$ to $N_{13}$) may be large and the average depth (the average length of a path from the root to the longest matching prefix) may be long. As an improvement, Srinivasan and Varghese designed a data structure and searching algorithm called controlled prefix expansion. See V. Srinivasan and G. Varghese, "Faster IP Lookups Using Controlled Prefix Expansion," ACM Sigmetrics'98, ACM Transactions on Computer Systems, March 1999. The data structure and search algorithm is based on a well-known fact that a smaller number of distinct prefix lengths lead to faster search for the longest prefix match. Using the controlled prefix expansion, a set of prefixes with M distinct lengths is converted to a set of prefixes with N distinct lengths, where N<M. FIG. 1B illustrates how the original set of prefixes in FIG. 1A, which has 7 distinct lengths, can be expanded into an expanded set of prefixes having 3 distinct lengths. FIG. 1B also shows how the expanded prefix set is placed in a multi-bit trie having a maximum path length of 3 compared to the binary trie in FIG. 1A that has a maximum path length of 7.

However, the controlled expansion search algorithm has the disadvantage of requiring prefix expansion for prefix lengths that are different from the N distinct lengths. Prefix expansion typically requires complicated software processing such as prefix sorting, prefix expanding, prefix restructuring, and the like when the lookup table is being updated. When prefix number reaches multi-million or more in a backbone router, the computer power consumed to handle these processing tasks will be significant. Furthermore, the controlled expansion search algorithm typically requires a special mechanism to handle multiple destinations on a same trie-walking path of multi-bit tries. One example of such a special mechanism is an auxiliary table for multiple destinations, which usually increases lookup latency and slows down performance of a lookup engine.

SUMMARY OF INVENTION

The present invention provides a method of searching for a longest prefix match for an address having a number of binary bits among a plurality of entries having different lengths of bits. The entries are associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers. Each of the entries corresponds to one trie node, and at least one trie node for L-bit trie match points to the first trie unit. Each trie node corresponds to a first, second, third, or fourth type of trie node. The method of searching according to an embodiment of the present invention first splits the address into at least a first key and a second key, each key including a predetermined number of address bits. Then, it determines a first matching node among the first number of trie nodes based on the address bits in the first key. Responsive to the first matching node corresponding to the first or second trie node type, the method selects the entry corresponding to the first matching node as the longest prefix match for the address. Also, responsive to the first matching node corresponding to the third or fourth trie node type, the method determines at least one second matching node in the first trie unit based upon the address bits in the second key.

According to another embodiment of the present invention, the trie further includes at least a second trie unit and the address is further split into at least a third key. The method of searching further determines the trie node type of the second matching node. Responsive to the second matching node corresponding to the first or second trie node type, the method selects the entry corresponding to the second matching node as the longest prefix match for the address. Responsive to the second matching node corresponding to the third or fourth trie node type, the method determines a third matching node in the second trie unit based upon the address bits in the third key.

According to one embodiment of the present invention, the address is an Internet address included in an Internet data packet and the entries include prefixes each associated with a destination port in an Internet router. The present invention enables fast and accurate routing of Internet data packets by using the trie structure according to the present invention.

According to still another embodiment of the present invention, a system searches for a longest prefix match for an address having a number of binary bits among a plurality of entries having different lengths of bits. The entries are associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers. Each of the plurality of entries corresponding to one trie node, and at least one trie node for L-bit trie match points to a trie unit. Each trie node corresponds to a first, second, third, or fourth type of trie node. The system comprises at least a first memory unit and a second memory unit coupled to the first memory unit, the first memory unit storing the first number of trie nodes and the second memory unit storing the first trie unit. The system also comprises at least a match decoder coupled to the second memory subunit and configured to match respective bits of the address with respective trie nodes in the trie unit stored in the second memory unit.

The hybrid trie structure of the present invention enables fast and accurate routing of Internet data packets, because the look-up process is shortened to merely L levels (stages) by the use of hybrid trie units, i.e., the critical path is significantly shortened. In addition, the look-up process is not complicated so as to require complicated software and does not present a computational burden on the processors in Internet routers. Thus, the address lookup engine of the present invention is suitable for very high-speed Internet network routing. The design of the hybrid trie is not complicated and is very highly pipelined, thus being suitable for high-density integrated circuit design. In addition, Internet routers embodying the hybrid trie structure of the present invention would consume only a small amount of power because the lookup process does not require complicated software processing compared with traditional longest match trie approaches.

According to still another embodiment of the present invention, a method inserts an entry having a destination pointer into a trie node in a trie used for a longest prefix match of an address having a number of binary bits. The trie has a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers and $K_1$ is smaller than $K_2$. At least one trie node for L-bit trie match points to the first trie unit, and each trie node is one of a free node, a leaf node, a path node, and a path-leaf node, the method comprising. The method first receives an insertion address, and splits the insertion address into at least a first key and a second key, each key including a predetermined number of address bits. The method determines a first matching node among the first number of trie nodes based on the address bits in the first key, the first matching node being the matching node for the L-bit trie match. Then, the method determines the node type of the first matching node. Responsive to the first matching node being a free node, the method changes the first matching node to a leaf node and assigns the destination pointer to the first matching node. Responsive to the first matching node being a leaf node, the method assigns the destination pointer to the first matching node. Responsive to the first matching node being a path node, the method changes the first matching node to a path-leaf node and conducts stack processing to update free nodes downstream the first matching node with the destination pointer. Responsive to the first matching node being a path-leaf node, the method conducts stack processing to update free nodes downstream the first matching node with the destination pointer.

According to still another embodiment of the present invention, a method deletes an entry from a trie node in a trie used for a longest prefix match of an address having a number of binary bits. The trie has a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers and $K_1$ is smaller than $K_2$. At least one trie node for L-bit trie match points to the first trie unit, and each trie node is one of a free node, a leaf node, a path node, and a path-leaf node. The method first receiving a deletion address, and splits the deletion address into at least a first key and a second key, each key including a predetermined number of address bits. Then, the method determines a first matching node among the first number of trie nodes based on the address bits in the first key, the first matching node being the matching node for the L-bit trie match. The method determines the node type of the first matching node. Responsive to the first matching node being a leaf node, the method changes the first matching node to a free node and assigns a free pointer to the first matching node. Responsive to the first matching node being a path-leaf node, the method changes the first matching node to a path node and conducts stack processing to update free nodes downstream the first matching node with the free pointer.

BRIEF DESCRIPTION OF THE DRAWINGS

FIG. 2B is a block diagram illustrating the content of a hybrid trie node according to one embodiment of the present invention.

FIG. 2C is a block diagram illustrating a hybrid trie unit according to one embodiment of the present invention.

FIG. 2D is a table showing how bits of an address are divided into keys, according to one embodiment of the present invention.

FIG. 4B is a truth table for a selection logic module in the address lookup engine, according to one embodiment of the present invention.

DETAILED DESCRIPTION OF EMBODIMENTS

Structure of the Hybrid-TRIE

Figure 2A:
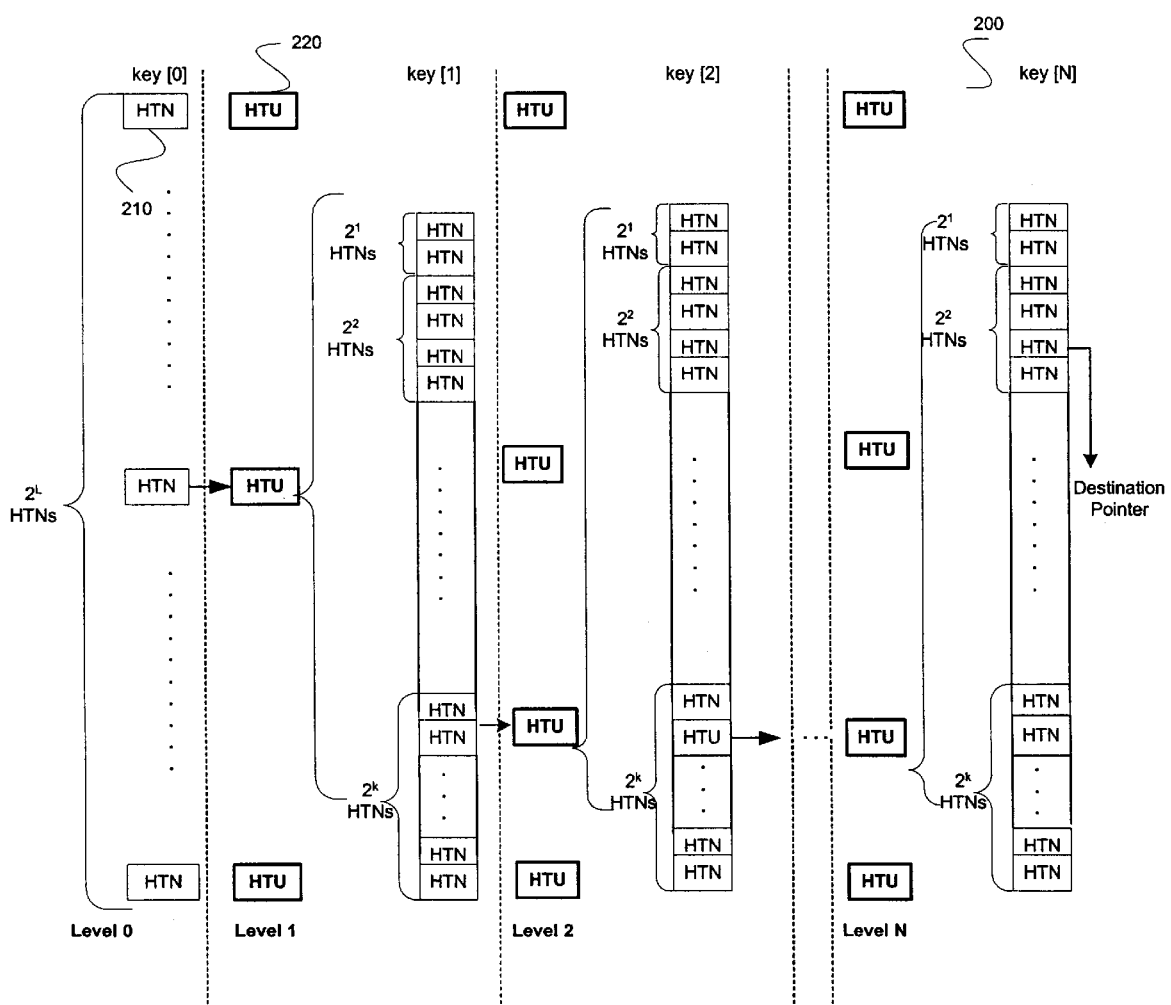
FIG. 2A is a block diagram illustrating a hybrid-trie structure according to one embodiment of the present invention.

In one embodiment of the present invention, a plurality of prefixes each having a prefix length are put together as a hybrid-trie (HT) having N+1 levels, where N is a positive integer. FIG. 2A is a block diagram illustrating a n HT 200 with N+1 levels, level 1, level 2, . . . , and level N+1. The HT 200 comprises at least one HTN for L-bit trie match 210 in level 0 (where L is a predetermined positive integer), and at least one HTU 220 in each level of level 1 to level N. The HT 200 of the present invention can be stored in any type of storage device or computer-readable medium. The terms "Level" and "Stage" are used interchangeably herein.

FIG. 2C is a block diagram illustrating an HTU 220 in the HT 200, according to one embodiment of the present invention. As shown in FIG. 2C, each HTU 220 in the HT 200 comprises a plurality of fields for a predetermined number of HTNs including $2^1$ HTNs ($n^1_0$ and $n^1_1$) for 1-bit trie match, $2^2$ HTNs ($n^2_0$, $n^2_1$, $n^2_2$, and $n^2_3$) for 2-bit trie match, and $2^k$ HTNs ($n^k_0, n^k_1, n^k_2, \ldots, n^k_{2^k-2}$, and $n^k_{2^k-1}$) for k-bit trie match, where k is a positive integer.

Figure 1A:
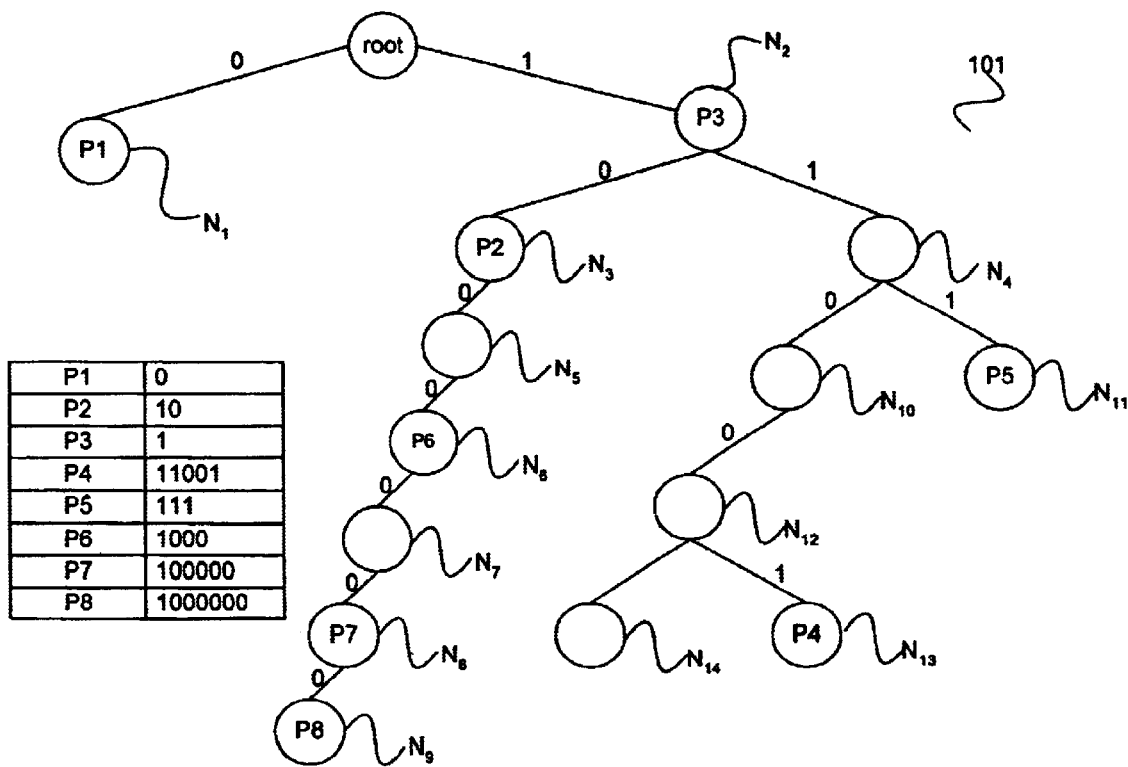
FIG. 1A is a block diagram illustrating a conventional binary trie structure for a set of binary strings.
Figure 1B:
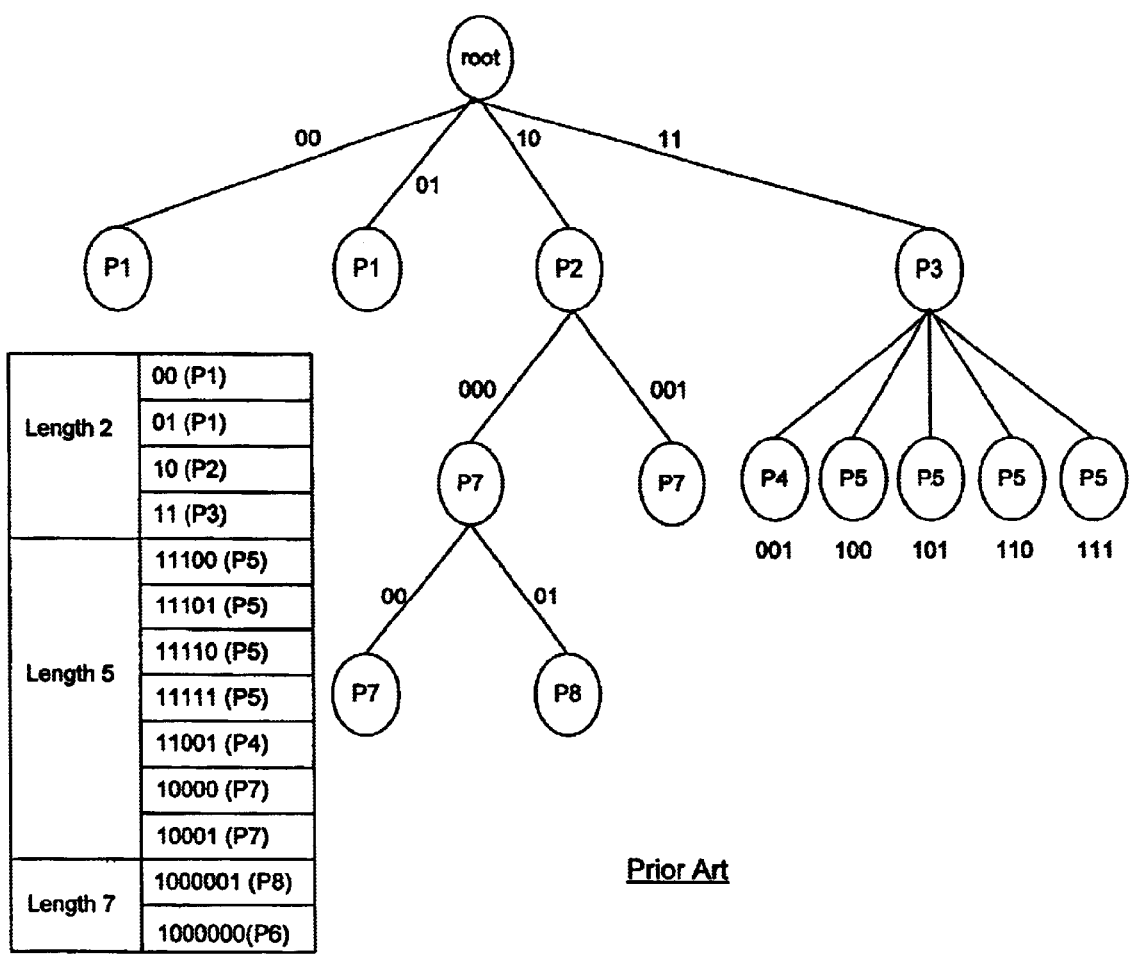
FIG. 1B is a block diagram illustrating a conventional multi-bit trie structure for an expanded set of prefixes.

Each HTN is of one the following types: leaf node, path node, path-leaf node, and free node. The four types of HTN can be explained with reference to the binary trie 101 in FIG. 1A. Each HTN will be associated with any one of the following in the binary trie: 1) a node corresponding to a prefix and not in a trie-walking path leading to another prefix (leaf node), such as nodes $N_1$, $N_9$, $N_{11}$, and $N_{13}$ in FIG. 1A; 2) a node not corresponding to a prefix but in a trie-walking path leading to a prefix (path node), such as nodes $N_4$, $N_5$, $N_7$, $N_{10}$, and $N_{12}$ in FIG. 1A; 3) a node corresponding to a prefix and in a trie-walking path leading to another prefix (path-leaf node), such as nodes $N_2$, $N_3$, $N_6$, and $N_8$, or 4) a node not corresponding to a prefix and not in a trie-walking path leading to a prefix (free node), such as node $N_{14}$ in FIG 1A. In one embodiment of the present invention, L is selected to be the shortest prefix length among the plurality of prefixes. Therefore, each HTN 210 in level 0 of the HT 200, if it is not a free node, corresponds to either a prefix having a prefix length L, or to the first L bits of a prefix having a prefix length larger than L. There are up to $2^L$ HTNs in level 0 of the HT 200.

Each HTN in level 0 of the HT 200 or in any of the HTUs 220 in the HT 200 will be referred to as an HTN 210 unless more specific reference is given. FIG. 2B is a block diagram illustrating a structure of the HTN 210, according to one embodiment of the present invention. As shown in FIG. 2B, the HTN 210 comprises a p flag and an l flag for indicating whether the HTN 210 is a leaf node, a path node, a path-leaf node, or a free node. When both the p flag and the l flag are 1, the HTN 210 is a path-leaf node. When the p flag is 1 and the l flag is 0, the HTN 210 is a path node. When the p flag is 0 and the l flag is 1, the HTN 210 is a leaf node. When both the p flag and the l flag are 0, the HTN 210 is a free node. The HTN 210 also comprises a d/n field. If the HTN is a free node, the d/n field is either empty or comprises a pointer pointing to a default destination port. When the HTN 210 is a leaf node, the d/n field comprises a destination pointer pointing to a destination port corresponding to the prefix associated with the HTN. The d/n field of a path node or path-leaf node HTN in level 0 comprises a next-stage pointer pointing to an HTU in level 2. In each HTU, the d/n field of a path node or path-leaf node HTN for i-bit trie match, where i=1, 2, . . . , k−1, is not used and may be left empty or comprises either a pointer to the default destination port or to a destination port. In each HTU, the d/n field of a path node or path-leaf node HTN for k-bit trie match comprises a next stage pointer.

Among the plurality of prefixes, each prefix having a length L is associated with an HTN 210 in the level 0 of the HT 200, each prefix having a length L+j (where j=1, 2, . . . , k) is associated with an HTN 210 for j-bit trie match in an HTU 220 in level 1 of the HT 200, and each prefix having a length L+(N−1)k+j is associated with an HTN 210 for j-bit trie match in an HTU 220 in level N of the HT 200. The HTNs having a prefix associated with it is either a leaf node or path-leaf node, and the HTNs not associated with any prefixes are either path nodes or free nodes.

Lookup Command Processing

Figure 2E:
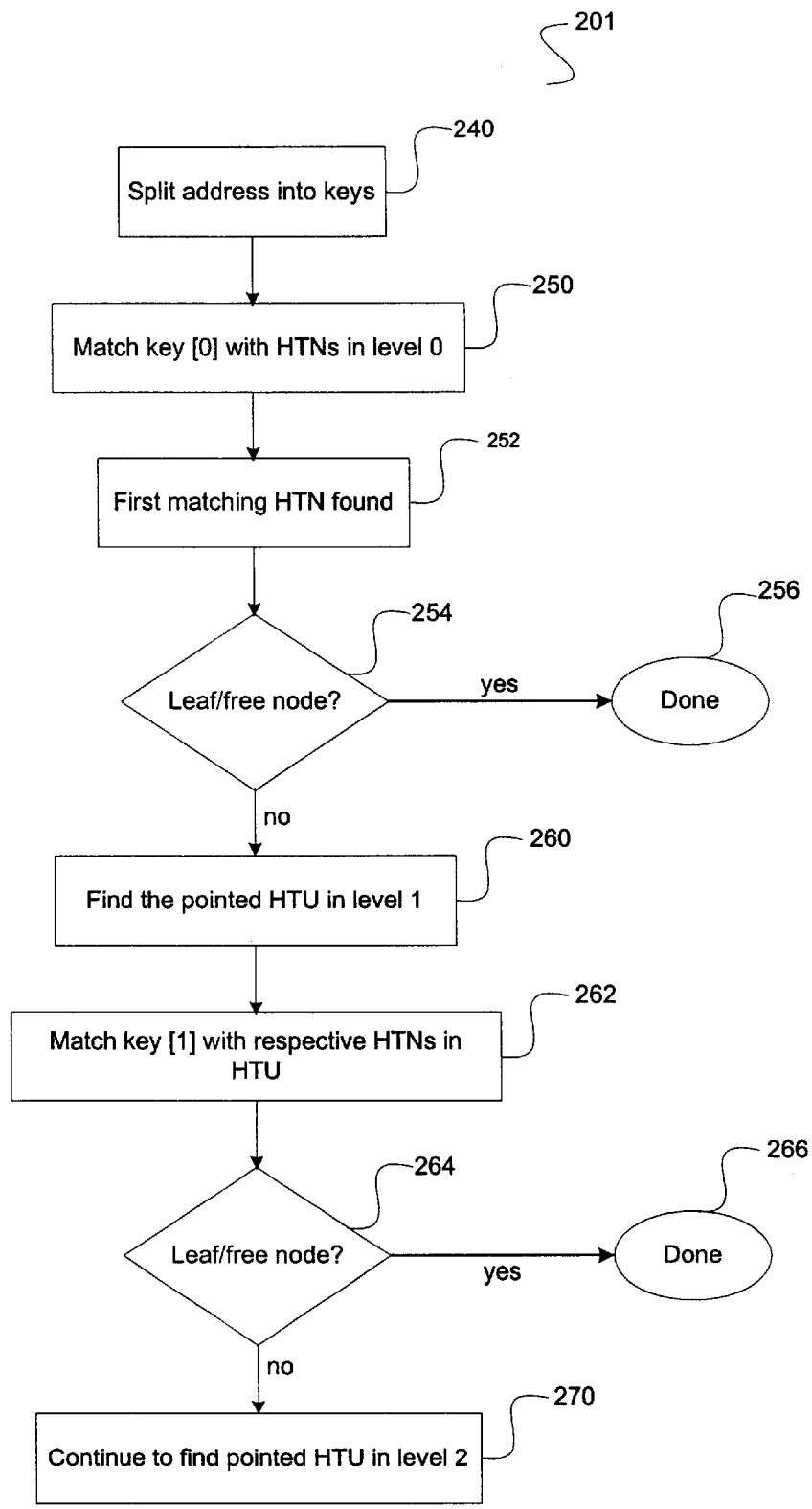
FIG. 2E is a flow chart illustrating a method for determining a destination port for an address, according to one embodiment of the present invention.

FIG. 2E is a flow chart illustrating an address lookup method 201 for determining a destination port for an address A having M address bits using the HT 200, according to one embodiment of the present invention. Referring now to FIGS. 2A, 2D and 2E, the address lookup method splits 240 the address bits of address A into at least one key, key[0], key[1], key[2], . . . and key[N], according to one embodiment of the present invention. Here, M is an integer and M≧L. FIG. 2D illustrates how the splits are done according to one embodiment of the present invention. As shown in FIG. 2D, where bit 0 represents the most significant bit of the address bits, and bit M−1 represents the least significant bit of the address bits, key[0] includes the first L most significant bits of the M address bits; key[1] includes the first k most significant bits of the remaining address bits if M≧L+k , or all of the remaining address bits if M≦L+k key[2] includes the first k most significant bits of the remaining address bits after the address bits in k[0] and k[1] if M≧L+2 k, or all of the remaining address bits after the address bits in k[0] and k[1] if M≦L+2 k; . . . ; and k[N] includes the remaining address bits after the first L+(N−1)k address bits if M>L+(N−1)k.

Thereafter, the address lookup method 201 matches 250 key[0] of the address A with the HTNs 210 in level 0 of the HT 200. If a first matching HTN is found 252, a determination 254 is made to determine whether the first matching HTN is a leaf or free node by examining the p flag in the first matching HTN. If the first matching HTN is a leaf or free node (p flag is 0), the d/n field of the first matching HTN will be used to find the destination port or a default routing port, respectively, and the address lookup for the address A is done 256. If the first matching HTN is a path node or a path-leaf node (p flag is 1), the next-stage pointer in the first matching HTN will be used to find 260 the HTU holding at least one second matching HTN in the next level (level 1). Then, the at least one second matching HTN is determined 262 by matching respective address bits in key[1] with respective HTNs in the HTU, in a manner as follows: the first 1 bit in key[1] will be matched with any HTNs for 1-bit trie match; the first two bits of key[1] will be matched with any HTNs for 2-bit trie match (if key[1] has more than 1 bit); . . . ; the first (k−1) bits of key[1] will be matched with any HTNs for (k−1)-bit trie match (if key[1] has more than k−2 bits), and the first k bits of key[1] will be matched with any HTNs for k-bit trie match (if key[1] has more than k−1 bits). For each second matching HTN found 262, starting from the second matching HTN found among the HTNs for 1-bit trie match to the second matching HTN found among the HTNs for k-bit trie match, a determination 264 is made to determine whether the second matching HTN is a leaf or free node by examining the p flag in the second matching HTN. If one second matching HTN is a leaf or free node, the d/n field of the one second matching HTN will be used to find the destination port or a default routing port, respectively, and the address lookup is done 266. If none of the second matching HTNs is a leaf or free node, the next-stage pointer in the second matching HTN for k-bit trie match will be used to find the HTU holding at least one third matching HTN in the next level (level 2) 270. Thereafter, a process similar to that carried out by steps 262–270 is performed at progressively higher levels until a matching HTN being a leaf node is found.

Figure 3:
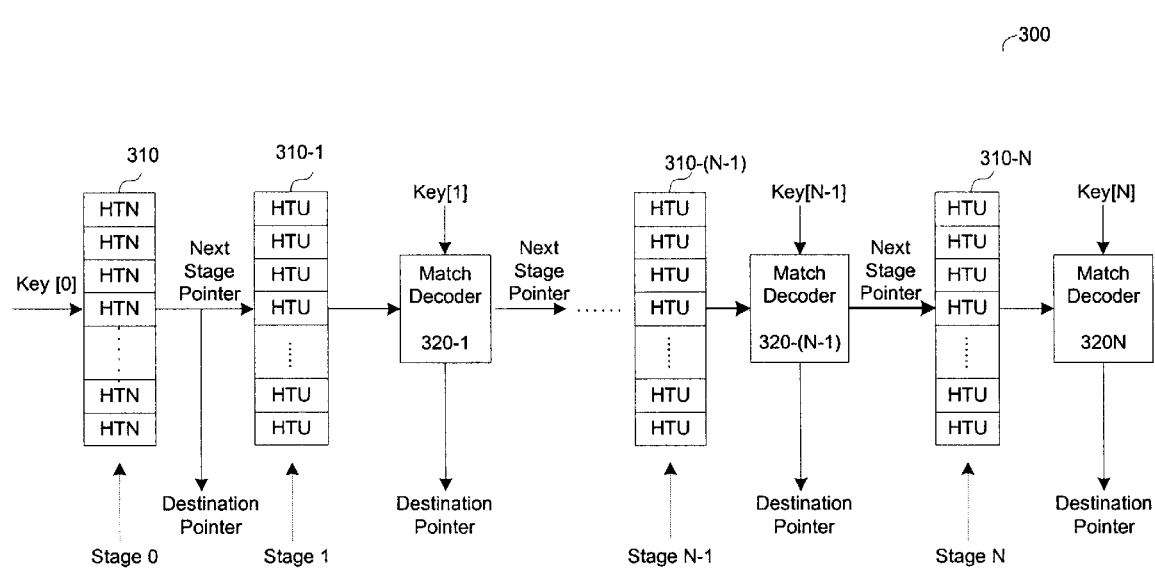
FIG. 3 is a block diagram of an address lookup engine according to one embodiment of the present invention.

FIG. 3 is a block diagram of a hybrid-trie address lookup engine (H-TALE) 300 that implements the address lookup method 201 using the HT 200, according to one embodiment of the present invention. The H-TALE 300 comprises N+1 memory subunits 310, 310-1 to 310-N, and N match decoders 320-1 to 320-N. The memory subunit 310-1 is coupled to the memory subunit 310, the match decoder 320-1 is coupled between the memory subunits 310-1 and 310-2, . . . , the match decoder 320-(N−1) is coupled between the memory subunits 310-(N−1) and 310-N, and the match decoder 320-N is coupled to the memory subunit 310-N. The N+1 memory subunits may be part or all of a larger memory unit (not shown).

As shown in FIG. 3, the lookup engine 300 may be divided into N+1 pipelined stages, according to one embodiment of the present invention. Stage 0 includes the memory subunit 310, stage 1 includes the memory subunit 310-1 and the match decoder 320-1, . . . , stage (N−1) includes the memory subunit 310-(N−1) and the match decoder 320-(N−1), and stage N includes the memory subunit 310-N and the match decoder 320-N. The memory subunit 310 includes memory spaces for storing the HTNs 210 in level 0 of the HT 200, the memory subunit 310-1 includes memory spaces for storing the HTUs in level 1 of the HT 200, . . . , the memory subunit 310-(N−1) includes memory spaces for storing the HTUs in level N−1 of the HT 200, and the memory subunit 310-N includes memory spaces for storing the HTUs in level N of the HT 200.

At system power up, all of the HTNs in the memory subunit 310 and the HTNs in the HTUs in the memory subunits 310-1 to 310-N are free nodes. Thereon, the system is initialized for each prefix entry, a leaf node HTN is created with its d/n field pointing to a destination pointer, any free node HTN in the trie-walking path leading to the leaf node HTN corresponding to the prefix entry is changed to a path node, and any leaf node HTN in the same trie walking path is changed to a path-leaf node. When performing an address lookup operation involving the address A, the address bits in key[0] of the address A are used as an index for finding the first matching HTN stored in the memory subunit 310 in stage 0. If the first matching HTN is a leaf or free node, the destination pointer or null pointer in the first matching HTN is output from the lookup engine 300. If the first matching HTN is a path node or a path-leaf node, the next-stage pointer in the first matching HTN is used to find the pointed HTU in the memory subunit 310-1 in stage 1. The match decoder 320-1 coupled between the memory subunit 310-1 and 310-2 includes logic circuits configured to find the second matching HTNs in the pointed HTU. If one of the second matching HTNs is a leaf node or free node, the match decoder 310-1 outputs the destination pointer or the null pointer in the one second matching HTN. On the other hand, if none of the second matching HTNs is a leaf node, the match decoder 320-1 outputs the next-stage pointer in the second matching HTN for k-bit trie match to the memory subunit 310-2. The next-stage pointer in the second matching HTN for k-bit trie match will be used to find the pointed HTU in the memory subunit 310-2, and so on, until a destination pointer or null pointer is found for the address A.

Figure 4A:
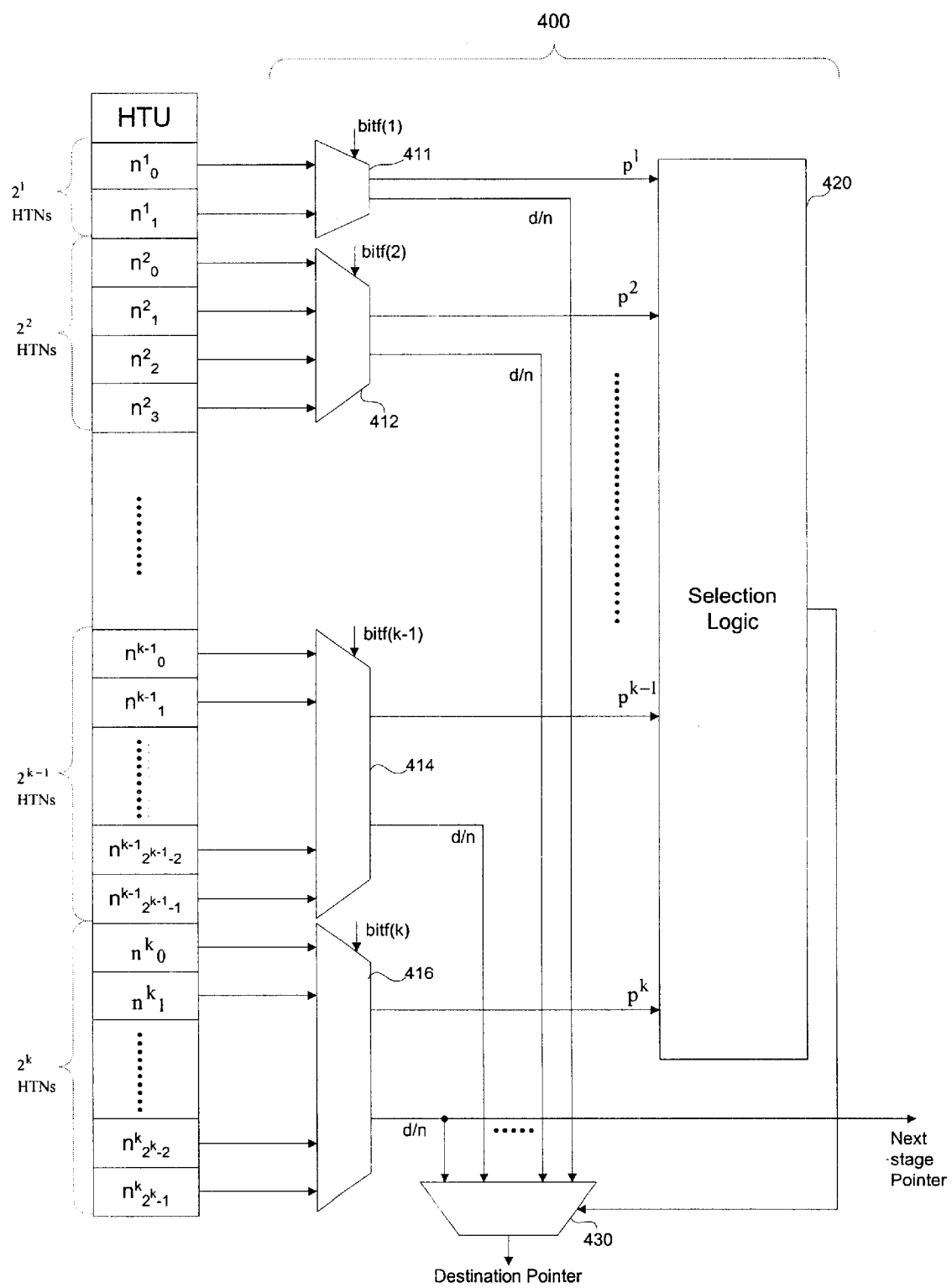
FIG. 4A is a schematic block diagram of a match decoder in the address lookup engine, according to one embodiment of the present invention.

FIG. 4A is a schematic block diagram of a match decoder in the address lookup engine, according to one embodiment of the present invention. In FIG. 4A, each of the match decoder 320-1, 320-2, . . . , 320-(N−1), and 320-N will be referred to below as a match decoder 400. As shown in FIG. 4A, the match decoder 400 receives an HTU 220 and the key[i], where i=1, 2, . . . , or N, and outputs either a destination pointer or a next stage pointer. FIG. 4A is a schematic block diagram of the match decoder 400, according to one embodiment of the present invention. The match decoder 400 comprises a $2^1 \times 1$ multiplexer 411, a $2^2 \times 1$ multiplexer 412, . . . , a $2^{k-1} \times 1$ multiplexer 414, and a $2^k \times 1$ multiplexer 416, where k is a positive integer. The match decoder 400 further comprises a selection logic module 420 coupled to each of the $2^1 \times 1$ multiplexer 411, the $2^2 \times 1$ multiplexer 412, . . . , the $2^{k-1} \times 1$ multiplexer 414, and the $2^k \times 1$ multiplexer 416, where k is a positive integer. The match decoder 400 further comprises a k×1 multiplexer 430 coupled to the selection logic module and to each of the $2^1 \times 1$ multiplexer 411, the $2^2 \times 1$ multiplexer 412, . . . , the $2^{k-1} \times 1$ multiplexer 414, and the $2^k \times 1$ multiplexer 416.

The $2^1 \times 1$ multiplexer 411 includes input ports for receiving the $2^1$ HTNs for 1-bit trie match ($n^0_0$ and $n^0_1$) in the HTU 220, and matches the first bit, bitf(1), of key[i] with $n^0_0$ and $n^0_1$. If a match is found, such as $n^1_0$, the $2^1 \times 1$ multiplexer 411 outputs the p flag $p^1$ in $n^1_0$ to the selection logic module 420 and the value in the d/n field in $n^1_0$ to the k×1 multiplexer 430. Likewise, the $2^2 \times 1$ multiplexer 412 includes input ports for receiving the $2^2$ HTNs for 2-bit trie match ($n^2_0$, $n^2_1$, $n^2_2$, and $n^2_3$) in the HTU 220, and matches the first 2 bits, bitf(2), of key[i] with $n^2_0$, $n^2_1$, $n^2_2$, and $n^2_3$. If a match is found, such as $n^2_3$, the $2^2 \times 1$ multiplexer 412 outputs the p flag $p^2$ in $n^2_3$ to the selection logic module 420 and the value in the d/n field in $n^2_3$ to the k×1 multiplexer 430. The functions of the other multiplexers 414 and 416 for the other bits bitf(k−1) and bitf(k) are similar to those of the multiplexers 411 and 412 as shown in FIG. 4A.

The selection logic module 420 includes logic circuits configured to receive the p flag(s) from the multiplexers 411, 412, . . . , 414 and 416, to determine whether any of the matching HTNs is a leaf node based on the received p flags, and if such a matching HTN exists, to generate a destination pointer selector for the k×1 multiplexer to select the destination pointer in the d/n field of the matching HTN.

FIG. 4B is a truth table for the selection logic module, according to one embodiment of the present invention. In one embodiment of the present invention, a p flag of 1 indicates that the corresponding HTN is a path node or path leaf node, and a p flag of 0 indicates that the corresponding HTN is a leaf node or free node. As shown in FIG. 4B, going from $p^1$ (the p flag from multiplexer 411) to $p^k$ (the p flag from multiplexer 416), when a p flag is zero, the search done indicator will be 1 indicating that the destination pointer for the address A is found and the search is completed. Also, the destination pointer in the d/n field of the HTN corresponding to that zero p flag will be selected at the k×1 multiplexer 430 based on the corresponding destination pointer selector. If none of the p flags is zero, the search done indicator is 0, meaning that the search is not complete and the next-stage pointer from the $2^k$×1 multiplexer 416 will be output to the memory subunit in the next stage for continued lookup operation, until a search done indicator is received by a control unit (not shown).

Insert/Delete Command Processor

Figure 5:
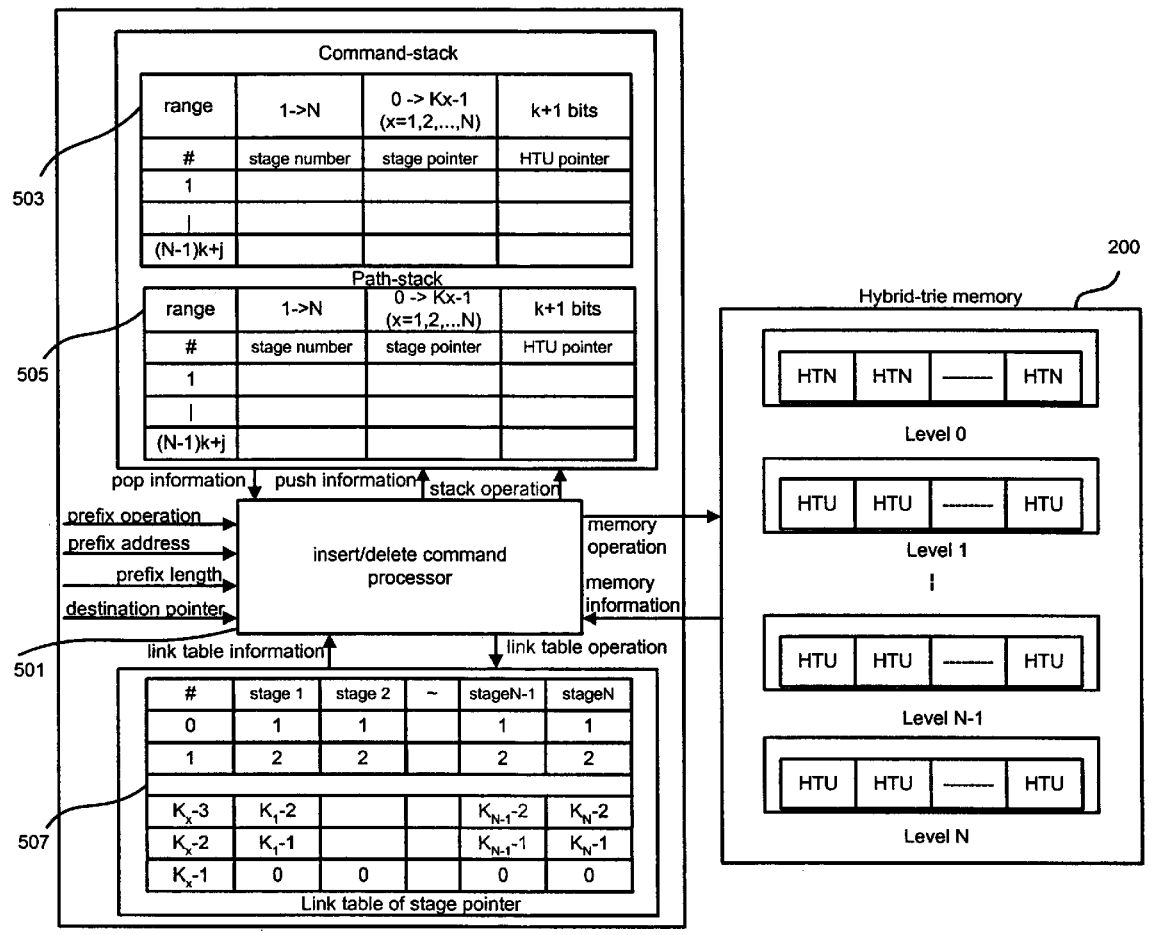
FIG. 5 is an interaction diagram illustrating the insertion and deletion processes that modify a hybrid-trie (HT) structure routing table.

FIG. 5 is an interaction diagram of the insertion and deletion processes that modify a hybrid-trie structure routing table (HT) 200. An insert/delete command processor 501 conducts the insertion and deletion processes. The insert/delete command processor 501 utilizes a stack (FILO: first in last output) operation, composed of a command stack table 503 and a path stack table 505, along with a link table 507 to convert incoming prefix operation commands (e.g., insert or delete), prefix addresses, prefix lengths and destination pointers into changes in the HT 200. The command stack table 503, the path stack table 505, and the link table 507 may be stored in a memory device.

The command stack table 503 stores a stage number (hierarchical stage that the current HTN inhabits in the HT 200), a stage pointer (pointer to a HTU downstream from the current HTN), and the HTU pointer (e.g., a pointer that points to a specific HTN) for a given HTU. These data will be used in an insertion process to recursively update and store destination pointers of HTNs in next hierarchy bit-tries of the HT 200. The insert/delete command processor 501 utilizes the path stack table 505 during a delete operation to release next-stage pointers, which previously pointed to an HTU that has since had all the HTNs stored under that HTU changed back to free nodes. The link table 507 stores various next-stage pointers (e.g., pointer to specific HTUs) in a link-list data structure for each stage and the command processor 501 tracks the head pointer (first free pointer) and the tail pointer (last free pointer) of each stage link-list.

Insertion Command Processing

Figure 6A:
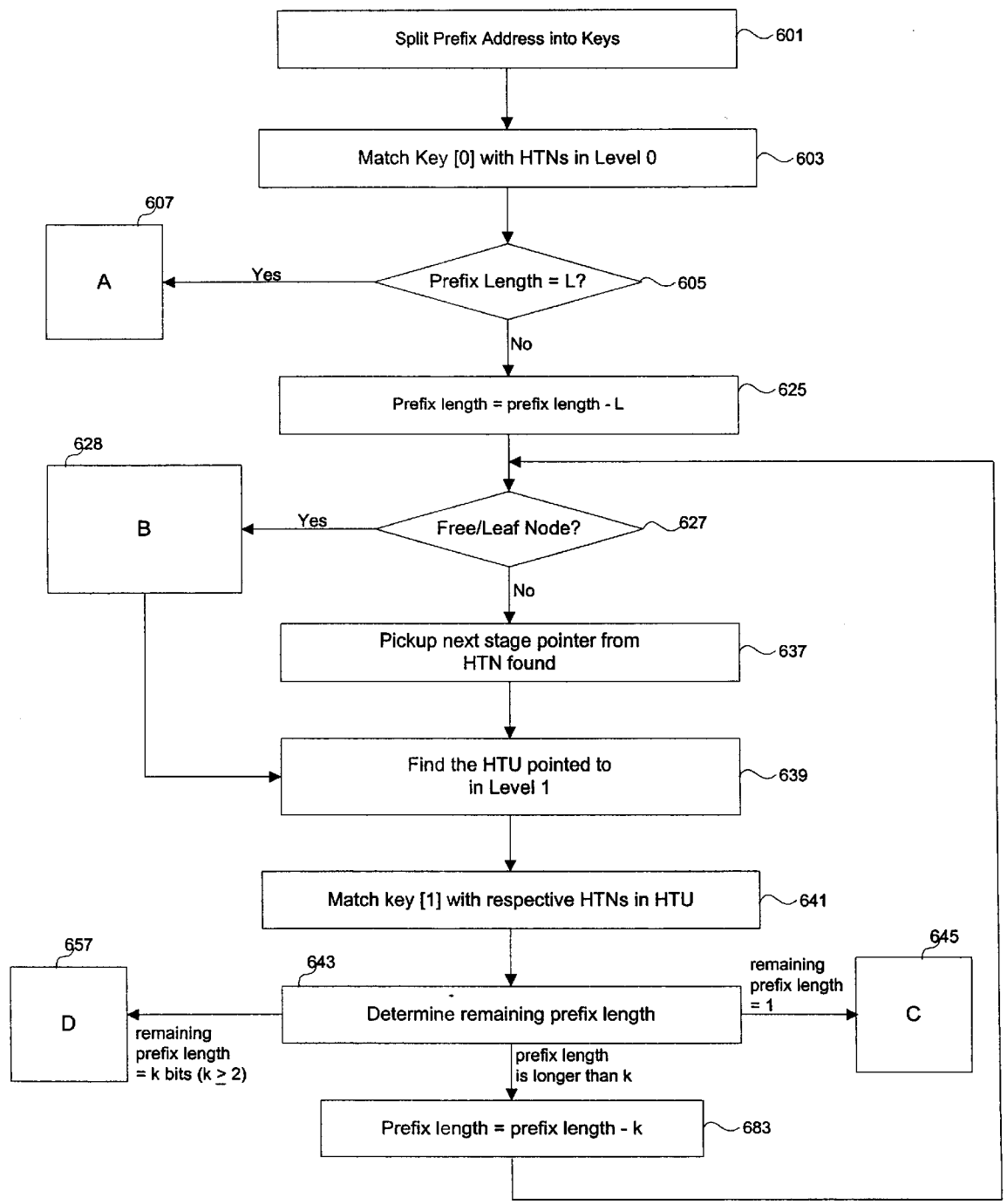
FIG. 6A is a flowchart illustrating a prefix address insertion method 600 for inserting prefix addresses into a HT 200, according to one embodiment of the present invention.

FIG. 6A is a flowchart illustrating a prefix address insertion method for inserting prefix addresses into a HT 200, according to one embodiment of the present invention. The insert/delete command processor ("command processor") 501 in FIG. 5 conducts the insertion process.

Referring to FIG. 6A, the command processor 501 first splits 601 the address A into at least one key, key[0], key[1], key [2], . . . and key[N], according to one embodiment of the present invention. The process of splitting the address into one or more keys is similar to the process of splitting the prefix into multiple keys discussed above with regard to the lookup method 201.

Next, the command processor 501 matches 603 key[0] of the address A with the HTNs 210 in Level 0 of the HT 200. Then, the command processor determines 605 whether the prefix length is equal to L. If the prefix length is equal to L and the command processor 501 finds a first matching HTN to the L bit prefix, the process goes to Process A 607.

Figure 6B:
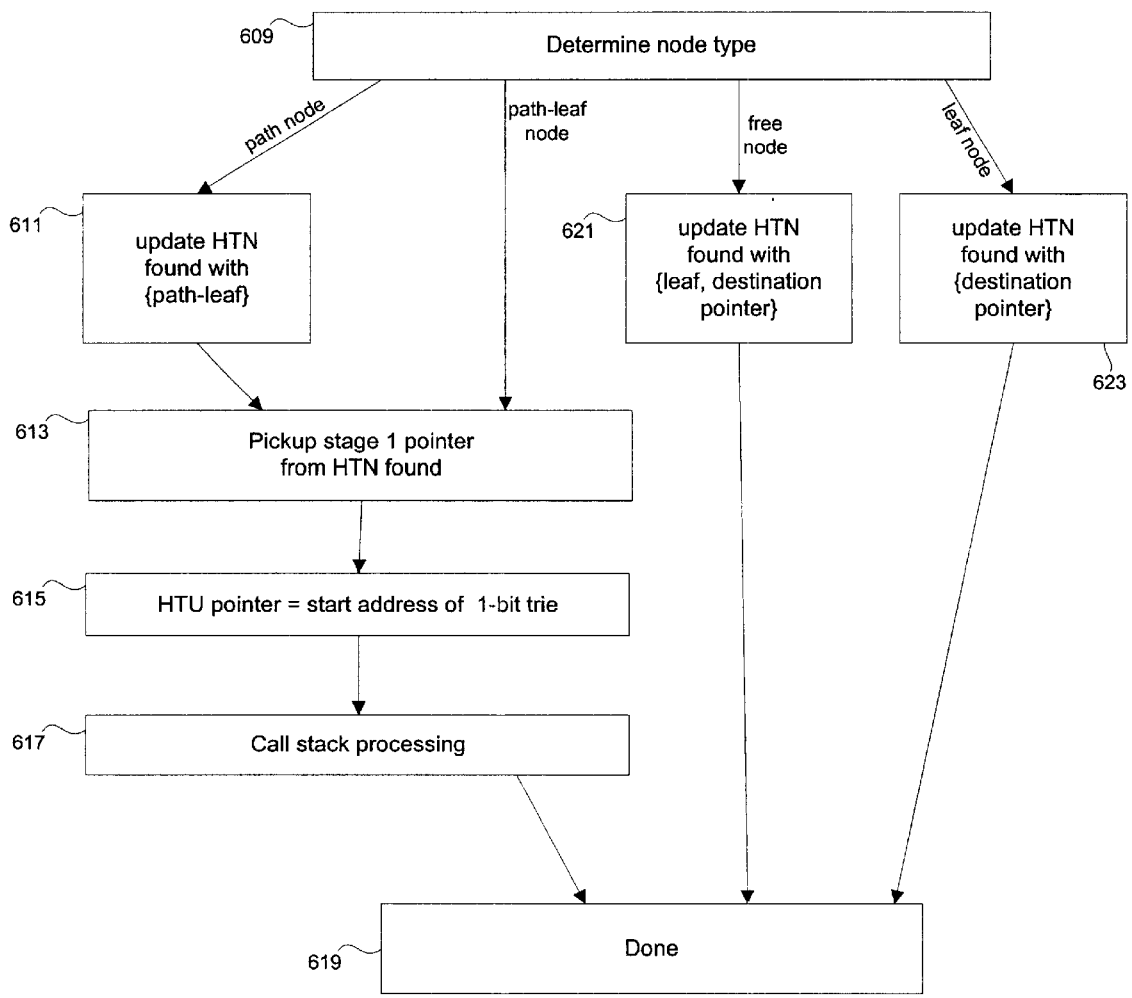
FIG. 6B is a flowchart illustrating Process A 607 in FIG. 6A.

Process A is illustrated in FIG. 6B. Referring to FIG. 6B, the command processor 501 determines 609 if the HTN is a path node, path-leaf node, free node or leaf node. If the command processor 501 determines 609 that the first matching HTN is a path node, it updates 611 the HTN found by changing the node designation from a path node to a path-leaf node, and retrieves 613 a next-stage (stage 1 pointer) from the HTN found. Then, the HTU pointer is updated 615 to point to the first HTN in the 1-bit trie of the HTU to which the next stage (stage 1) pointer points. Thereafter, stack processing is called 617 and the process is done 619. Stack processing for the insertion process 617 will be explained in detail below.

If the command processor 501 determines 609 that the first matching HTN is a path-leaf node, the node designation is not changed, but the command processor 501 retrieves 613 the next stage (stage 1) pointer from the HTN found. Then, the HTU pointer is updated 615 to point to the first HTN in the 1-bit trie of the HTU to which the next stage (stage 1) pointer points. Thereafter, stack processing is called 617 and the process is done 619.

If on the other hand, the command processor 501 determines 609 that the HTN that matches the L-bit prefix is a free node, the command processor 501 updates 621 the free HTN found by changing its node designation to a leaf node and assigning it a destination pointer. Then, the process is done 619. If the HTN found is a leaf node, the command processor 501 does not update the leaf HTN's node designation but may update 623 the destination pointer. Then, the process is done 619. At this point, the L-bit prefix has been added to the HTN in Level 0 and the insertion process 600 is complete.

When Prefix Length is Greater than L in Insertion Command Processing

If the prefix length does not equal L, the command processor 501 in step 625 subtracts L from the prefix length. Then, the command processor determines 627 if the node in the HT 200 that matches the first L-bits of the prefix is a free node or leaf node. If the node matching the first L-bits of the prefix is a free node or a leaf node, the process goes to Process B 628.

Figure 6C:
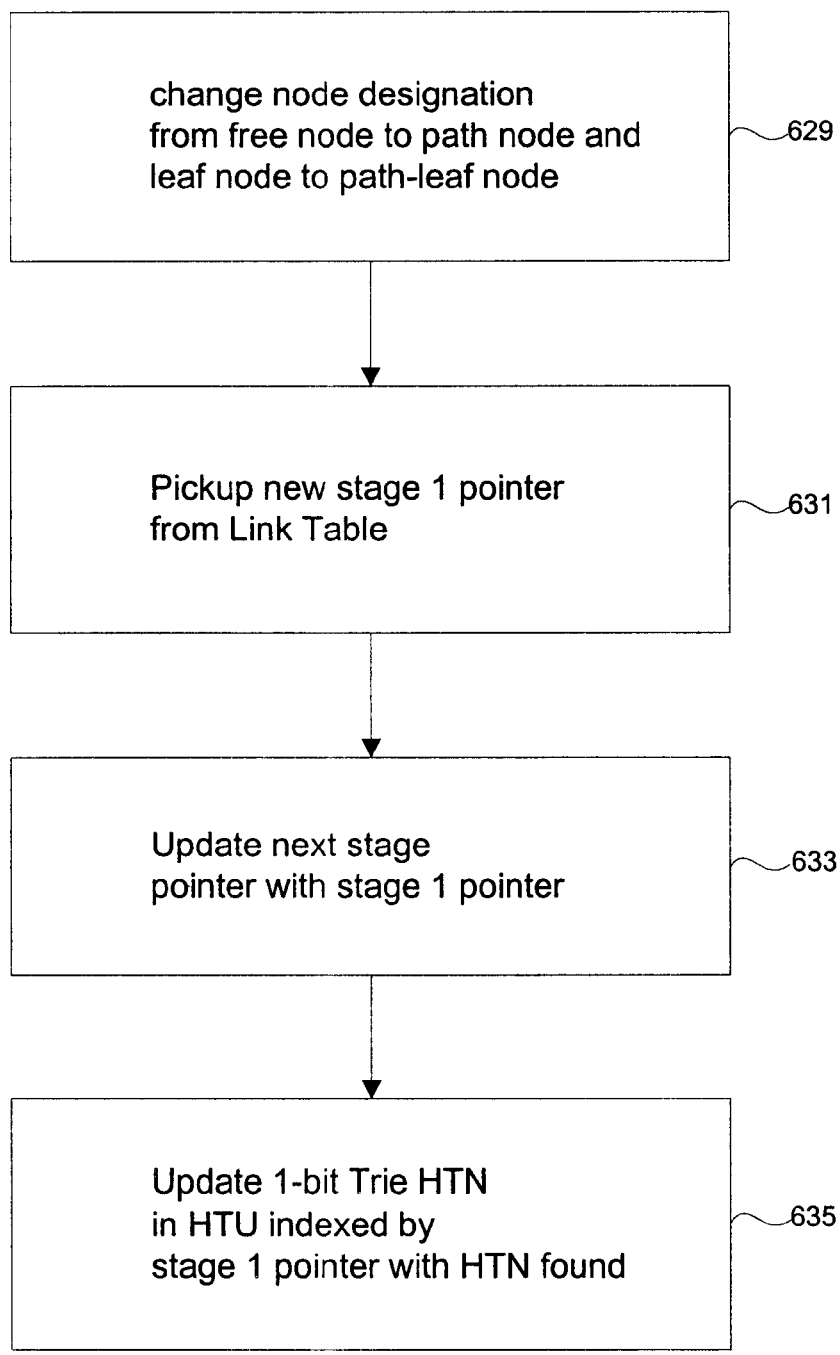
FIG. 6C is a flowchart illustrating Process B 628 in FIG. 6A.

Process B is illustrated in FIG. 6C. In Process B, the command processor first changes 629 the node designation of the HTN found. If the HTN found is a free node, it is changed to a path node. If the HTN found is a path node, it is changed to a path-leaf node. Next, the command processor 501 retrieves 631 an unused next stage pointer with the head pointer (first free pointer of stage 1) from the link table 507, and updates 633 the L-bit HTN next stage pointer with the retrieved next stage pointer. As a result, the new head pointer is moved to the next unused next stage pointer pointed to by the retrieved next stage pointer in the link table 507. Next, the command processor 501 updates 635 the destination pointer of the first two 1-bit trie HTNs in the HTU pointed to by the newly assigned next stage pointer with the destination pointer of the HTN found.

Referring to FIG. 6A again, if the node matching the first L-bits of the prefix is a path node or a path-leaf node, the command processor 501 retrieves 641 the next stage pointer from the matching HTN found. Next, using either the next stage pointer retrieved from an existing path node or path-leaf node, or using the newly assigned next stage pointer assigned to a free node or leaf node that had been converted to a path node or path-leaf node during Process B, the command processor 501 finds 639 the HTU in Level 1 pointed to by the next stage pointer.

Next, the command processor 501 matches 641 key [1] with respective HTNs in the HTU found. In similar fashion to the matching step 262 in the lookup process 201, the at least one second matching HTN is determined by matching respective address bits in key[1] with respective HTNs in the HTU, in a manner as follows: the first 1 bit in key[1] will be matched with any HTNs for 1-bit trie match; the first two bits of key[1] will be matched with any HTNs for 2-bit trie match (if key[1] has more than 1 bit); . . . ; the first (k−1) bits of key[1] will be matched with any HTNs for (k−1)-bit trie match (if key[1] has more than k−2 bits), and the first k bits of key[1] will be matched with any HTNs for k-bit trie match (if key[1] has more than k−1 bits). The HTU pointers are used for the matching. Then, the command processor 501 determines 643 the length of the remaining prefix of key[1].

Figure 6D:
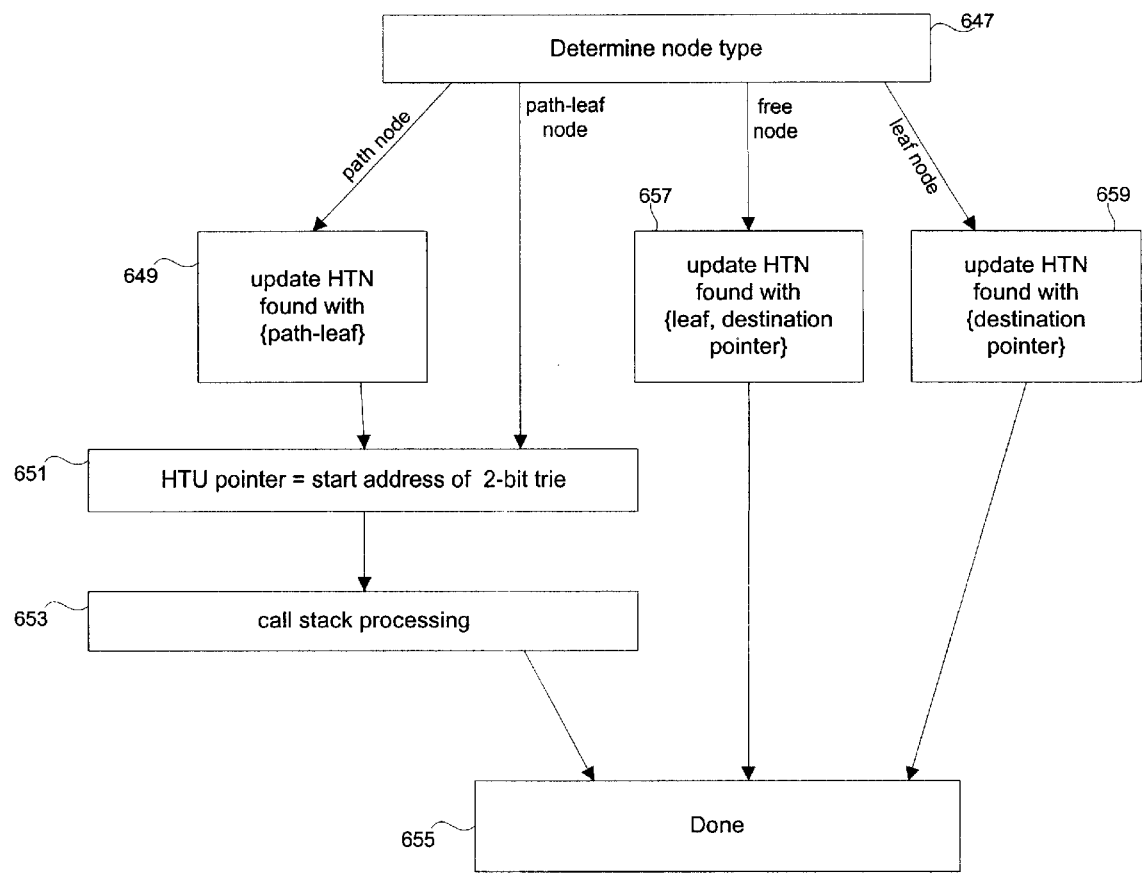
FIG. 6D is a flowchart illustrating Process C 645 in FIG. 6A.

If the remaining prefix length of key [1] is 1 bit, the Process C 645 is performed. Process C is illustrated in FIG. 6D. Referring to FIG. 6D, the command processor 501 determines 647 if the HTN in stage 1 that matches the 1 bit key [1] prefix is a path node, path-leaf node, leaf node, or free node. If the matching HTN is a path node, the command processor 501 updates 649 the node designation to a path-leaf node. Next, the HTU pointer is assigned 651 with the start address of the 2-bit trie, and stack processing is called 653. Then, the insertion process ends 655. If the matching HTN is a path-leaf node, the command processor 501 does not update the node designation. The HTU pointer is assigned 651 with the start address of the 2-bit trie, and stack processing is called 653. Then, the insertion process ends 655. If the matching HTN is a free node, the command processor 501 updates 657 the HTN found by changing its node designation to a leaf node and by updating the node's destination pointer. Then, the insertion process ends 655. If the matching HTN is a leaf node, no change is made to the node designation but a new destination pointer may be assigned 659. Then, the insertion process ends 655.

Figure 6E:
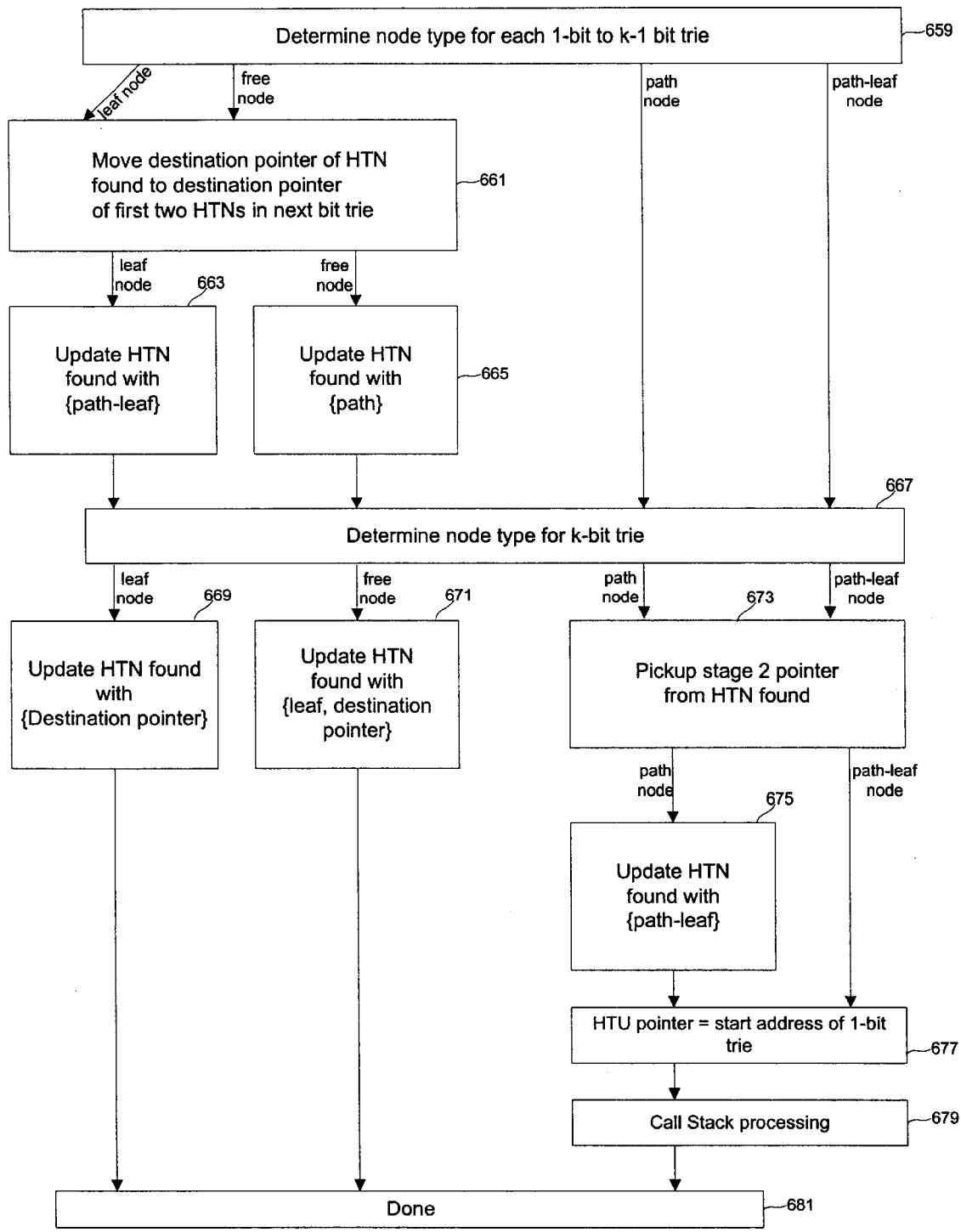
FIG. 6E is a flowchart illustrating Process D 657 in FIG. 6A.

Referring to FIG. 6A again, if the remaining key [1] prefix length is k (k>=2) bits, Process D 657 is performed. Process D is illustrated in FIG. 6E. Referring to FIG. 6E, the command processor 501 determines 659 for each 1-bit to k−1-bit trie match if the HTN in stage 1 that matches the key [1] prefix (1-bit to k−1 bit trie HTN in HTU indexed by the stage 1 pointer and the first 1 to k−1 bits of key[i]) is a path node, path-leaf node, leaf node, or free node. For each matching leaf HTN found in the 1-bit to k−1-bit trie, the destination pointer of the HTN found in the 1-bit trie to k−1-bit trie is moved 661 downstream to the destination pointer of the first two HTNs in its next bit trie (2-bit trie to k-bit trie) pointed to by the HTU pointer in the corresponding trie. Then, the node designations of the leaf HTNs in the 1-bit to k−1 bit trie are changed 663 to path-leaf node. For each matching free HTN in the 1-bit to k−1-bit trie found, the destination pointer of the HTN found in the 1-bit trie to k−1-bit trie is moved 661 downstream to the destination pointer of the first two HTNs in its next bit trie (2-bit trie to k-bit trie) pointed to by the HTU pointer in the corresponding trie. Then, the node designations of the free HTNs in the 1-bit to k−1 bit trie are changed 665 to path node. No operation is performed if the HTN found in the 1-bit to k−1 bit trie is a path or path-leaf node.

Then, the command processor determines 667 if the k-bit trie HTN matching the prefix is a leaf node, free node, path node, or path-leaf node. If the matching k-bit HTN is already a leaf node, the node designation will not be changed but a new destination pointer may be assigned to replace an old destination pointer, in which case the destination pointer will be updated 669. Then, the insertion process is complete 681. If the k-bit trie matching HTN is a free node, the command processor 501 updates 671 the HTN found by changing its node designation to a leaf node and updating the HTN's destination pointer. If the k-bit trie matching HTN is a path node or path-leaf node, a new next stage pointer (e.g., stage 2 pointer) is retrieved 673 from the HTN found. Then, if the k-bit trie matching HTN is a path node, the HTN's node designation is updated 675 to a path-leaf node. If the k-bit trie matching HTN is a path-leaf node, the node designation is not changed. In addition, for path nodes and path-leaf nodes, the command processor 501 assigns 677 a new HTU pointer to the start address of the 1-bit trie of the stage 2 HTU pointed to by the next stage pointer. Next, stack processing is called 679. Then, the insertion process is complete 681.

Referring to FIG. 6A again, if the prefix length is greater than L+k, the command processor 501 in step 683 subtracts k from the prefix length and repeats steps 627 to 683 at progressively higher levels (Levels 2 to N) until the entire prefix is inserted in the HT 200.

Stack Processing for Insertion Command Processing

Figure 6F:
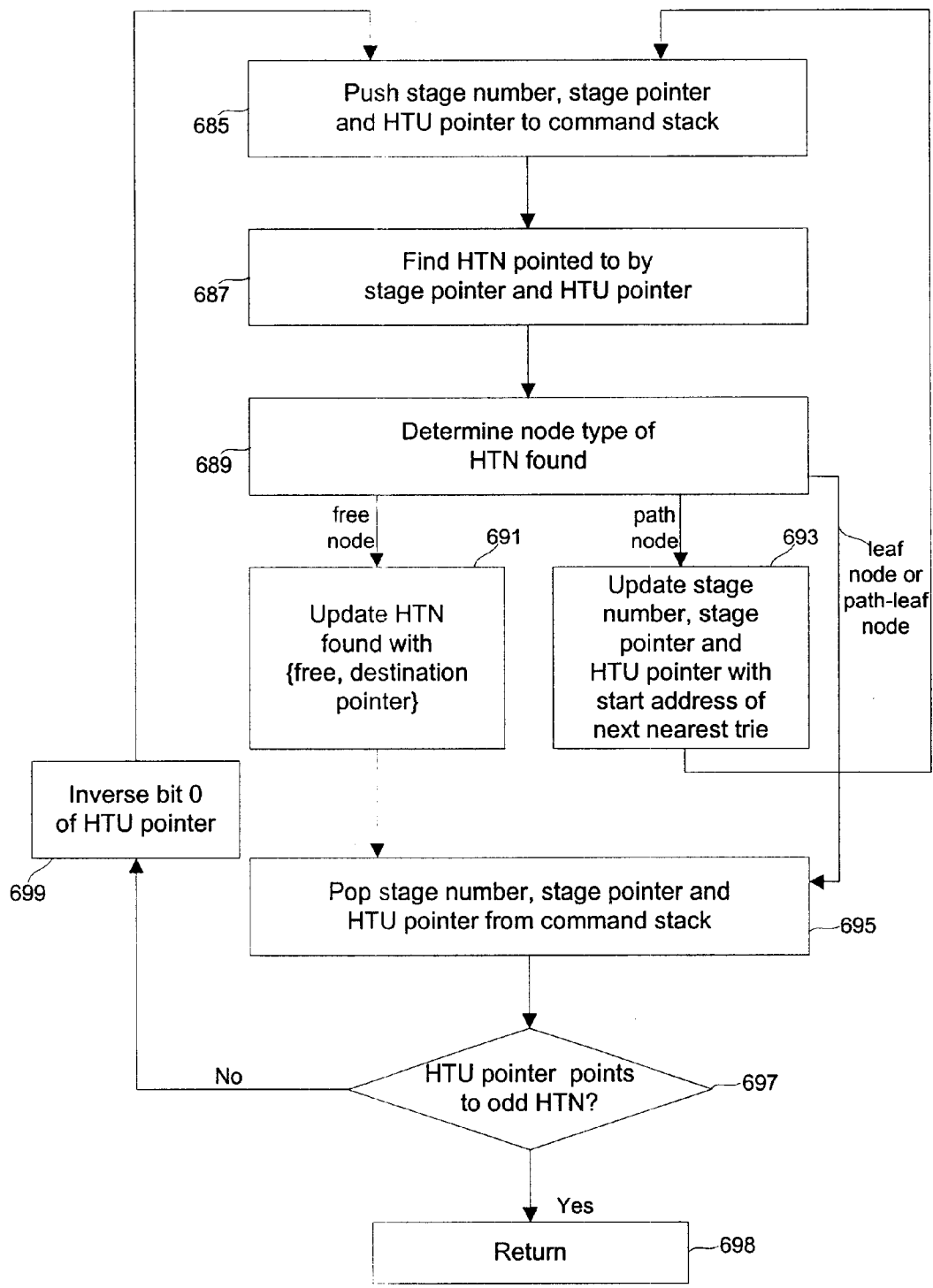
FIG. 6F is a flowchart illustrating stack processing for the insertion command processing.

FIG. 6F illustrates stack processing for insertion command processing. The function of stack processing is to recursively update free HTNs downstream of a path node branch with designation pointer information from upstream least common path-leaf HTNs. By updating free HTNs downstream, stack processing enables the system, during lookup 201, to conduct longest prefix matches.

For example, when searching for a 32-bit prefix address, consider a case where only the first 8 bits of that 32 bit prefix match a path-leaf HTN stored in a HT 200, and downstream of the 8 bit path-leaf HTN match, the remainder of the 32 bit prefix does not match with any leaf or path-leaf nodes downstream of the 8-bit path-leaf node, but instead eventually matches with a free node. If stack processing is performed, that free node with which a portion of the remainder of the 32 bit prefix (e.g., ≦24 bits) matches stores the destination pointer that the 8-bit path-leaf HTN would have stored as if it were a leaf node. In this case, the 8-bit path-leaf node that matches the first 8-bits of the 32-bit prefix searched is the longest non-free node that the 32-bit prefix address matches, which serves as the longest prefix match.

Stack processing includes several steps to accomplish an update procedure. First, stack processing pushes (or stores) 685 the stage number, next-stage pointer, and HTU pointer to the command stack table 503. Next, stack processing finds 687 the HTN pointed to by the stage pointer and the HTU pointer. Then, stack processing determines 689 the node type of the HTN found.

If stack processing determines that the HTN found is a free node, stack processing update 691 the free HTN found with a new destination pointer. This new destination pointer was input to the command processor 501 by the incoming prefix operation. If stack processing determines that the HTN found is a path node, stack processing updates 693 the stage number, next-stage pointer, and HTU pointer with the start address of the next nearest trie (the first HTN of the next downstream i-bit trie of the path HTN). Then, stack processing is recursively performed until the HTN found is a free node. If the HTN found is a leaf node or a path-leaf node, stack processing jumps directly to step 695.

Next, stack processing pops 695 the stage number, stage pointer and HTU pointer from the command stack list. Then, it is determined 697 if the HTU pointer points to an odd HTN in the trie (bit 0 of HTU pointer is 1). If so, then stack processing of the current recursion is finished 698. If the HTU pointer is not odd (bit 0 of HTU pointer is not 1), bit 0 of the HTU pointer is inversed 699 and stack processing jumps to step 685 for the stack processing of odd HTNs. This is necessary because there are always only two types (even and odd) of HTNs in the next nearest bit trie while traversing through the trie branch. Bit 0 (the least significant bit) of the HTU determines whether the HTU points to an even (bit 0=0)or odd (bit 0=1) HTN.

Deletion Command Processing

Figure 7A:
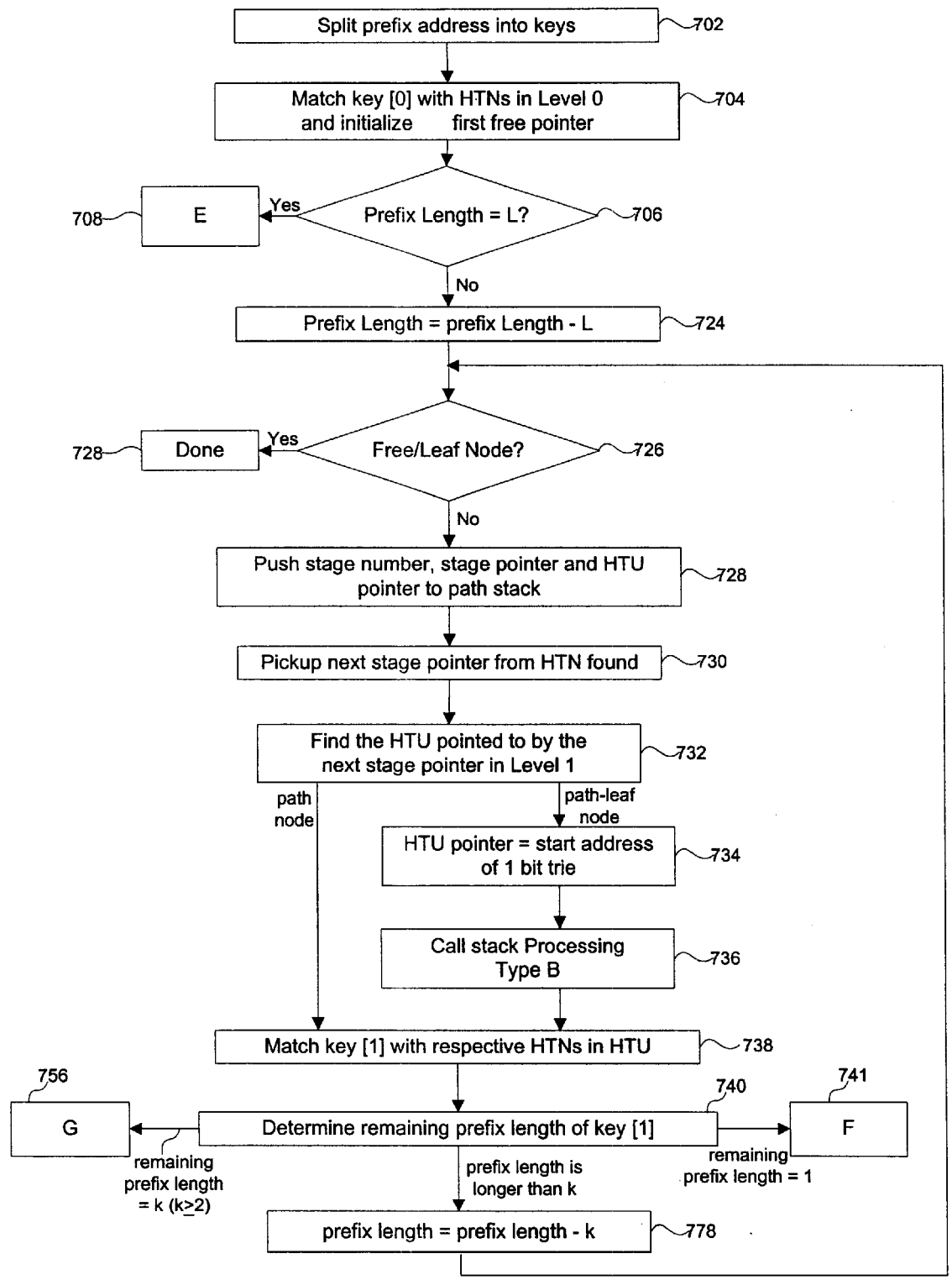
FIG. 7A is a flowchart illustrating a prefix address deletion method 700 for deleting prefix addresses from a HT 200, according to one embodiment of the present invention.

FIG. 7A is a flowchart illustrating a prefix address deletion method for deleting prefix addresses from the Hybrid Trie (HT) 200, according to one embodiment of the present invention. The command processor 501 conducts the deletion process. Referring to FIG. 7A in conjunction with FIG. 5, the command processor 501 first splits 702 the prefix address A into at least one key, key[0], key[1], key[2], ..., and key[N], according to one embodiment of the present invention. The process of splitting the address into one or more keys is similar to the process of splitting the prefix into multiple keys discussed above with regard to the lookup process 201.

Next, the command processor 501 matches 704 key[0] of the address A with the HTNs 210 in Level (Stage) 0 of the HT 200 and also initializes the first free pointer to a default location such as 0. Then, the command processor 501 determines 706 whether the prefix length equals L. If the prefix length equals L and the command processor finds a first matching HTN to the L bit prefix, the process goes to Process E 708.

Figure 7B:
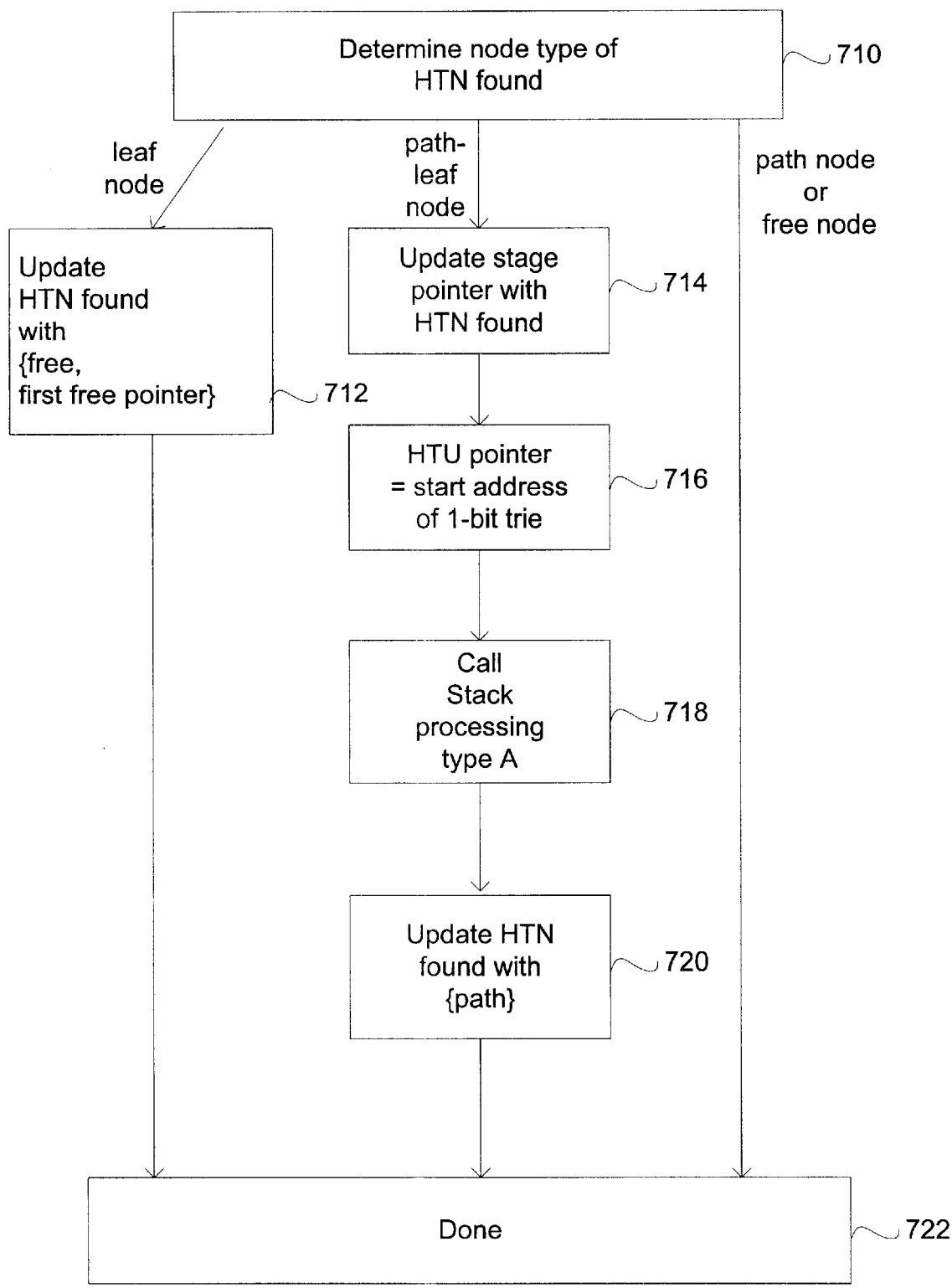
FIG. 7B is a flowchart illustrating Process E 708 in FIG. 7A.

Process E 708 is illustrated in FIG. 7B. Referring to FIG. 7B, the command processor 501 determines 710 if the HTN is a path node, path-leaf node, free node, or leaf node. If the command processor 501 determines 710 that the first matching HTN is a leaf node, the command processor 501 changes 712 the node designation of the HTN found to a free node and also updates the d/n field to store a first free pointer (a default location such as 0). If the command processor 501 determines 710 that the first matching HTN is a path node or free node, the command processor 501 does not update the node designation and the deletion process ends 722.

If the command processor 501 determines 710 that the first matching HTN is a path-leaf node, then the command processor 501 updates 714 the stage pointer with the HTN found. Here, the term "stage pointer" refers to the current stage pointer used by the command processor 501 for traversing down the HT 200. Path-leaf HTNs contain next stage pointers, and updating the stage pointer with the HTN found means moving the next stage pointer in the HTN found to the stage pointer used by the command processor for traversing down the HT 200. Then, the command processor 501 updates 716 the HTU pointer to point to the start address of the first HTN 1-bit trie pointed to by the stage pointer. Here, the term "HTU pointer" refers to the current HTU pointer used by the command processor 501 to traverse down the HT 200. Next, the command processor calls 718 stack processing (type A) to recursively update free HTNs downstream of the path-leaf node branch to point to a first free pointer (a default location such as 0) so that when the system conducts longest prefix matches during lookup it can return a first free pointer. Stack processing will be explained in detail below. Then, the command processor 501 changes 720 the node designation of the HTN found to a path node without making any changes to the d/n field in the HTN found, and the deletion process ends 722.

When Prefix Length is Greater than L in Deletion Command Processing

Referring again to FIG. 7A, if the prefix length does not equal L, the command processor in step 724 subtracts L from the prefix length. Then, the command processor determines 726 if the HTN in the HT 200 that matches the first L-bits of the prefix is a free node or leaf node. If the HTN matching the first L-bits of the prefix is a free node or leaf node, this means that there is no branch downstream the HTN so the command processor 501 ends 728 the deletion process.

If the HTN matching the first L-bits of the prefix is a path node or path-leaf node, this means that there is a branch downstream the matching HTN. In this case, the command processor 501 pushes 728 the stage number, stage pointer, and the HTU pointer currently used by the command processor to the path-stack 505, and retrieves 730 the next stage pointer from the HTN found. Next, the command processor 501 finds 732 the HTU in Level 1 pointed to by the next stage pointer that was retrieved from the HTN found. In addition, when the HTN matching the first L-bits of the prefix is a path-leaf node, the HTU pointer is updated 734 to point to the start address of the 1-bit trie and stack processing (type B) is called 736 to find the first free pointer. Stack processing will be explained in detail below.

Next, the command processor 501 matches 738 key[1] with respective HTNs in the HTU found 732. In similar fashion to the matching step 262 in the lookup process of 201, at least one second matching HTN is determined by matching respective address bits in key[1] with respective HTNs in the HTU, in a manner as follows: the first 1 bit in key[1] will be matched with any HTNs for 1-bit trie match; the first two bits of key[1] will be matched with any HTNs for 2-bit trie match (if key[1] has more than 1 bit); matched in the same manner for the first three bits, the first four bits, up to the first (k−2) bits; the first (k−1) bits of key[1] will be matched with any HTNs for (k−1)-bit trie match (if key[1] has more than (k−2) bits), and the first k bits of key[1] will me matched with any HTNs for k-bit trie match (if key[1] has more than k−1 bits). The HTU pointers are used for the matching.

Figure 7C:
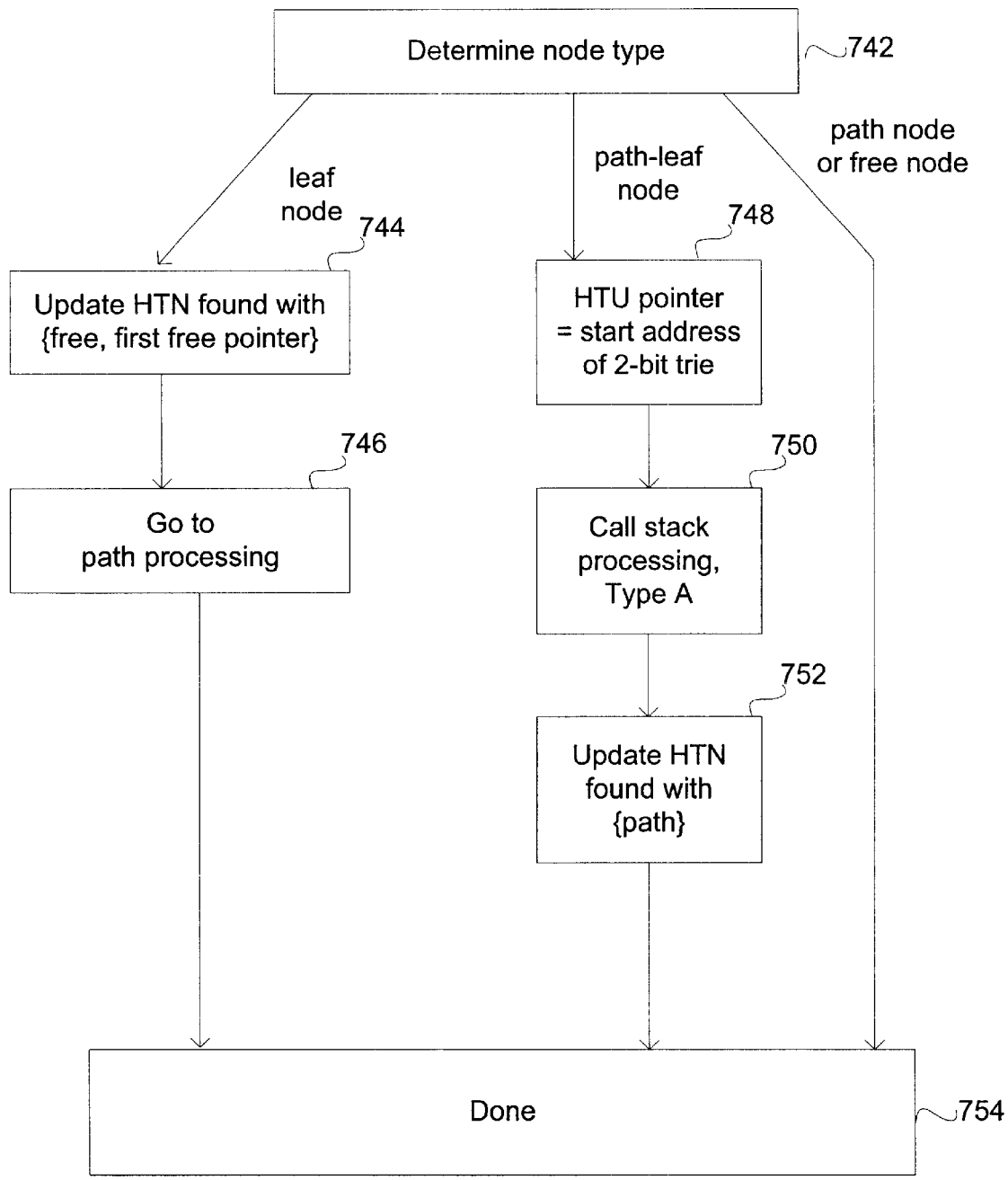
FIG. 7C is a flowchart illustrating Process F 741 in FIG. 7A.

Then, the command processor determines 740 the remaining prefix length of key[1]. If the remaining prefix length of key[1] is one bit, process F 741 is performed. Process F is illustrated in FIG. 7C. Referring to FIG. 7C, the command processor 501 determines 742 if the HTN in stage 1 that matches the 1-bit key[1] prefix is a path node, path-leaf node, leaf node, or free node. If the matching HTN is a leaf node, the command processor 501 changes 744 the node designation to a free node and the d/n field to store a first free pointer. Then, the command processor 501 goes to path processing 746 in order to convert upstream path nodes to free nodes or to convert upstream path-leaf nodes to leaf nodes. Path processing is necessary here because it is necessary to release stage pointers in the upstream nodes back to the link table 507 and convert the upstream node types. Path processing will be explained in detail below. Then, the deletion process ends 754. If the matching HTN is a path-leaf node, the command processor 501 assigns 748 the start address of the 2-bit trie to the HTU pointer, calls 750 stack processing (Type A), and changes 752 the node designation of the HTN found to a path node without changing the d/n field. Here, path processing is not required, because the path-leaf node has been changed to a path node and stage pointers in nodes upstream of a path node cannot be released. Then, the deletion process ends 754. If the matching HTN is a path node or free node, the deletion process ends 754 without any operation.

Figure 7D:
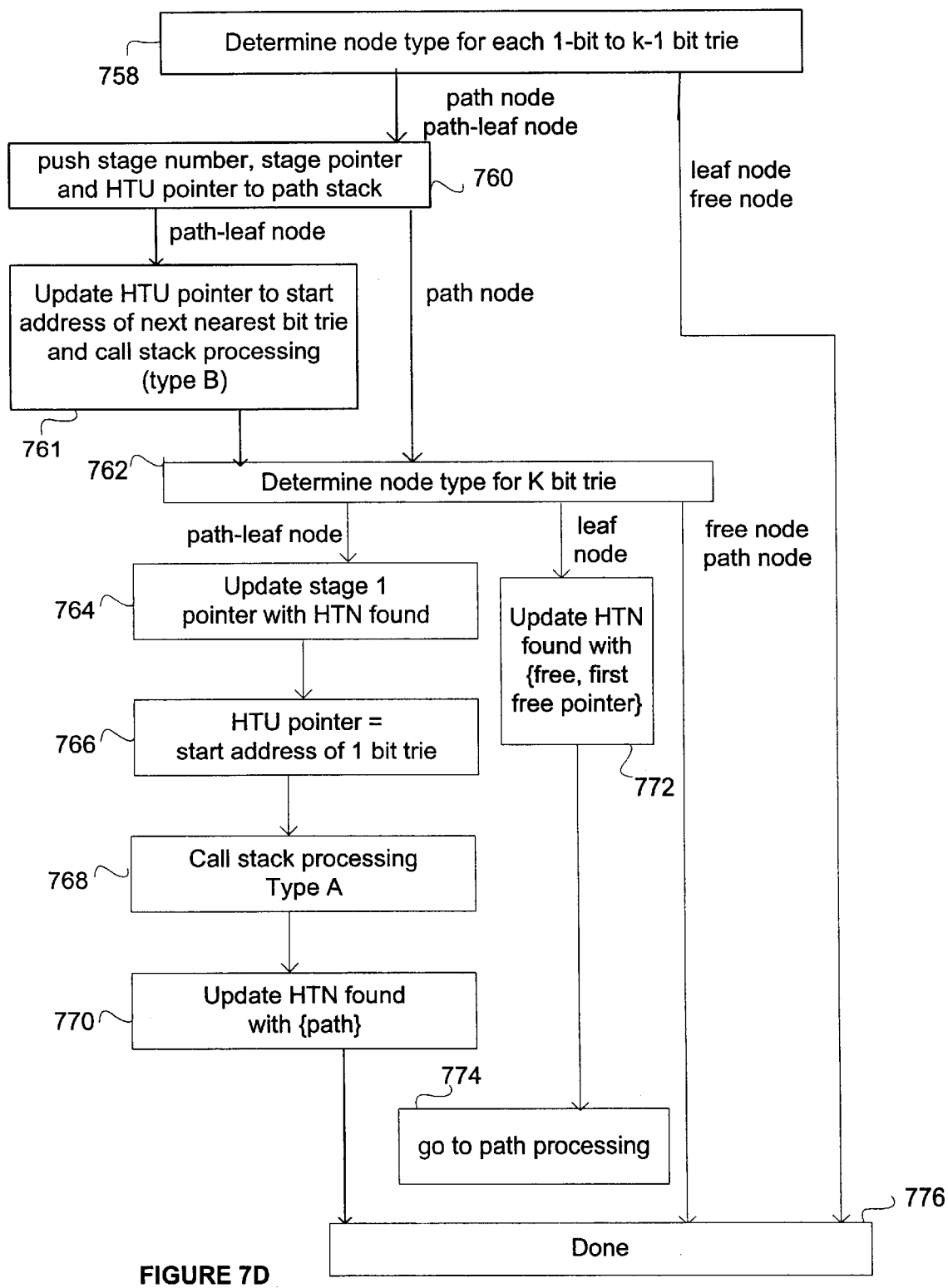
FIG. 7D is a flowchart illustrating Process G 756 in FIG. 7A.

Referring to FIG. 7A again, if the key[1] prefix length is k (k>=2), Process G 756 is performed. Process G is illustrated in FIG. 7D. Referring to FIG. 7D, the command processor 501 first determines 758 for each 1 bit to k−1 bit trie match if the HTN in stage 1 that matches the key[1] prefix (1-bit to k−1 bit trie HTN in HTU indexed by the stage 1 pointer and the first 1 to k−1 bits of key[1]) is a path node, path-leaf node, leaf node, or free node. For each matching path HTN or path-leaf HTN found in the 1-bit trie to k−1 trie, the command processor 501 pushes 760 the current stage number, stage pointer, and the HTU pointer to the path stack 505. Thereafter, for each matching path-leaf HTN found in the 1-bit to k−1 bit trie, the command processor 501 updates 761 the HTU pointer to the start address of the next nearest bit trie and stack processing (type B) is called 761 to find the first free pointer. If the matching HTN is a free node or a leaf node indexed by the stage 1 pointer and the first 1 to (k−1) bits of key[1] such that it is found within the 1-bit to (k−1)-bit trie, then the command processor 501 ends 776 the deletion process.

Next, the command processor 501 determines 762 if the k-bit trie HTN matching the prefix is a leaf node, free node, path node, or path-leaf node. If the matching HTN is free node or path node found in the k-bit trie (i.e., the matching HTN is indexed by the stage 1 pointer and all of the k bits of key[1]), then the command processor 501 ends 776 the deletion process. If the matching HTN is a leaf node found in the k-bit trie, the command processor 501 changes 772 the node designation to a free node and updates the d/n field to store a first free pointer. Then, the process goes 774 to path processing, and then the deletion process ends 776.

If the matching HTN is a path-leaf node found in the k-bit tree (i.e., the matching HTN is indexed by the stage 1 pointer and all of the k bits of key[1]), the command processor 501 updates 764 the stage 1 pointer with the stage pointer of the HTN found so that it becomes a stage 2 pointer, and updates 766 the HTU pointer to point to the start address of the 1-bit tree of the HTU pointed to by new stage 2 pointer. Then, the command processor 501 calls 768 stack processing (Type A), and changes 770 the node designation of the HTN found to a path node without changing the d/n field. Path processing is not required here, because the path-leaf node has been changed to a path node and stage pointers in nodes upstream of a path node cannot be released. Then, the deletion process ends 776.

Referring to FIG. 7A again, if the prefix length is greater than L+k, the command processor 501 subtracts k from the prefix length in step 778 and repeats steps 726 to 778 at progressively higher levels (Levels 2 to N) until the prefix is completely deleted from HT 200.

Stack Processing for Deletion Command Processing

Figure 7E:
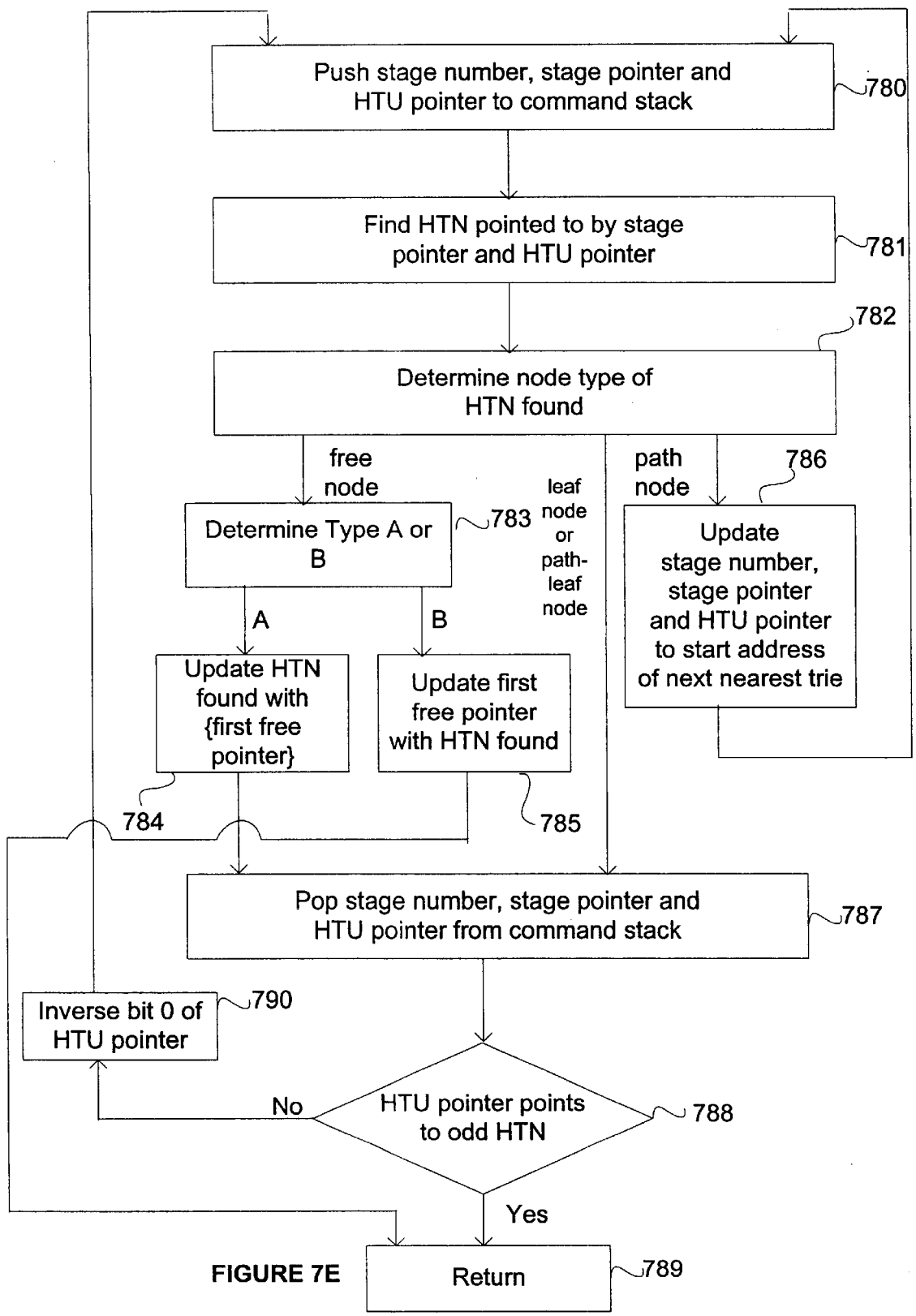
FIG. 7E is a flowchart illustrating stack processing for the deletion command processing.

FIG. 7E illustrates stack processing for deletion command processing. There are two types of stack processing in deletion command processing, Type A and Type B. The function of Type A stack processing for the deletion command is to recursively update free HTNs downstream of path-leaf node branches to point to a first free pointer. The function of Type B stack processing for the deletion command is to recursively find free HTNs downstream of path-leaf node branches to return the most updated first free pointer. In this manner, when the system conducts longest prefix matches during lookup it can return a first free pointer. For example, when searching for a 32-bit prefix address, consider a situation where only the first 8 bits of that 32 bit prefix match a path-leaf HTN stored in a HT 200, and the remainder of the 32 bit prefix does not match any leaf or path-leaf node located downstream of the 8-bit path-leaf node, but instead eventually matches with a free node. Stack processing (Type A) updates the d/n pointer of such free node to store a first free pointer that the 8-bit path-leaf HTN would have stored as if it were a leaf node. In this case, the 8-bit path-leaf node that matches the first 8-bits of the 32-bit prefix searched is the longest non-free node that the 32-bit prefix address matches, which serves as the longest prefix match and points to a first free pointer.

Stack processing includes several steps to accomplish the update (Type A) or find (Type B) procedure. Referring to FIG. 7E, stack processing pushes 780 the stage number, next-stage pointer, and HTU pointer to the command stack table 503. Next, stack processing finds 781 the HTN pointed to by the stage pointer and HTU pointer. Then, stack processing determines 782 the node type of the HTN found.

If the HTN found is a free node, stack processing determines whether the stack processing operation is a type A or type B operation. For type A operation, stack processing updates 784 the d/n field of that free HTN found with a first free pointer. For type B operation, stack processing updates 785 the first free pointer with pointer information in the HTN found and ends 789 stack processing.

If the HTN found is a path node, stack processing updates 786 the stage number, stage pointer, and HTU pointer to point to the start address of the next nearest trie of the path HTN. Then, stack processing is recursively called so that the process is repeated in the same manner until the HTN found is a free node. If the HTN found is a leaf node or path-leaf node, stack processing moves on to step 787 without any operation.

Next, stack processing pops 787 the stage number, stage pointer and HTU pointer from the command-stack list. Then, it is determined 788 if the HTU pointer points to an odd HTN in the trie (bit 0 of HTU pointer is 1). If so, then stack processing of the current recursion is finished 789. If the HTU pointer is not odd (bit 0 of HTU pointer is not 1), bit 0 of the HTU pointer is inversed 790 and stack processing jumps back to step 780 for the stack processing of odd HTNs. This is necessary because there are always only two (even and odd) HTNs in the next nearest bit trie while traversing through the trie branch. Bit 0 (the least significant bit) of the HTU determines whether the HTU points to an even (bit 0=0) or odd (bit 0=1) HTN.

Path Processing for Deletion Command Processing

Figure 7F:
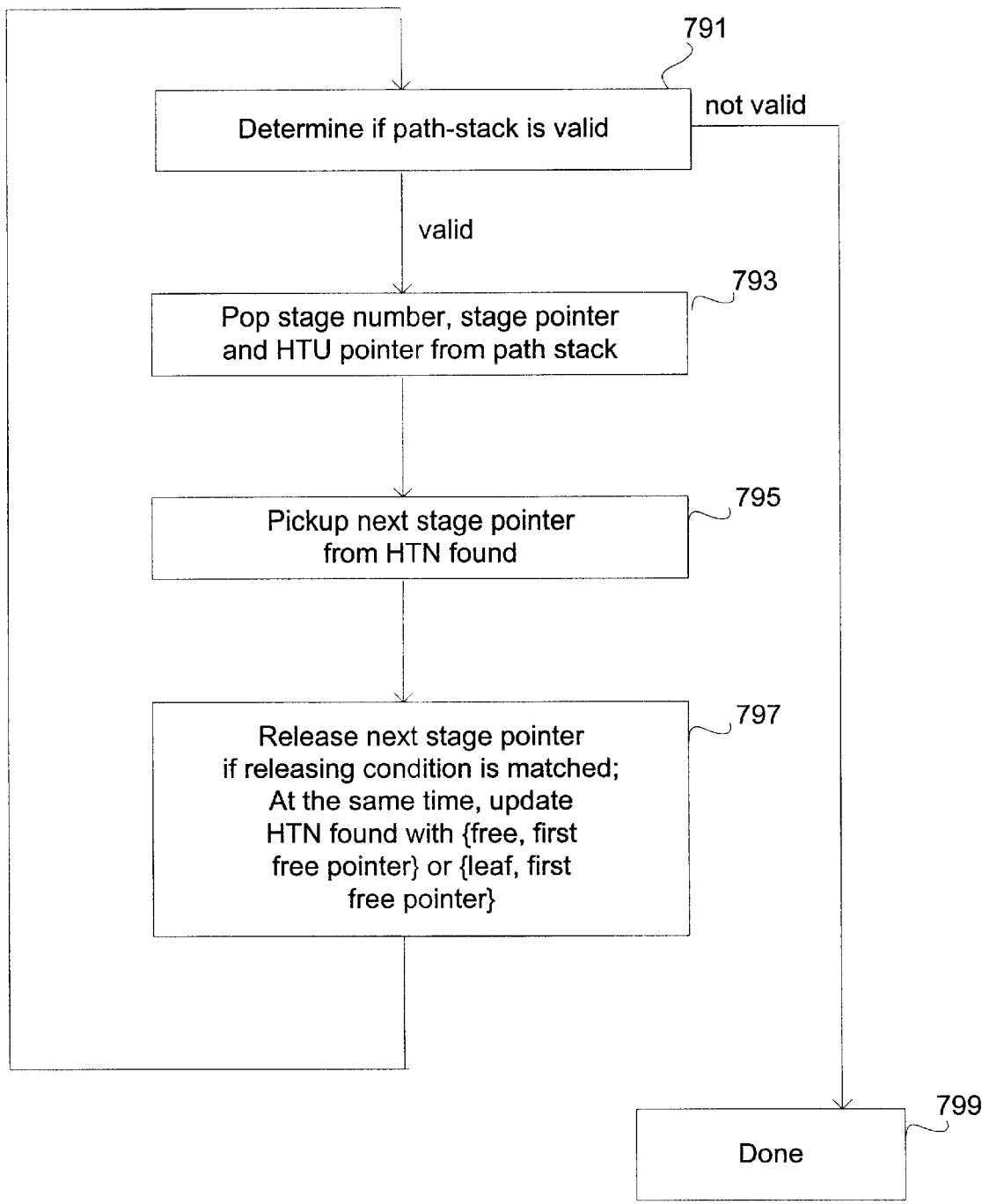
FIG. 7F is a flowchart illustrating path processing for the deletion command processing.

Path processing is illustrated in FIG. 7F. The command processor 501 calls path processing in order to convert upstream path nodes to free nodes or to convert upstream path-leaf nodes to leaf nodes. In other words, the main purpose of path processing is to release the stage pointers back to the link table 507 and also change the node type of upstream path nodes and path-leaf nodes.

Referring to FIG. 7F, path processing first determines 791 whether or not the path stack 505 is valid (not empty), and if the path stack 505 is not valid (path stack 505 is empty)

then the path processing process ends 799. A non-valid path stack means that there are no upstream nodes. If the path stack 505 is valid, then path processing pops 793 the stage number, stage pointer, and HTU pointer from the path stack 505. The popped information is used to index into the next nearest upstream bit trie and determine whether or not the stage pointer should be released (when the releasing condition is satisfied, as explained below). Then, path processing picks up 795 the next stage pointer from the HTN found. Then, if the releasing condition is satisfied, the next stage pointer is released 797 to the link table 507. The releasing condition is satisfied when the two HTNs in the HTU of the next nearest bit trie are free nodes and the next nearest bit trie is a 1-bit trie. At the same time, path processing updates 797 the node designation of the HTN found from path node to a free node or from path-leaf node to a leaf node and its d/n field to store the first free pointer. Then, the process returns to step 791 to repeat the path processing process until the path-stack is not valid (i.e., there is no upstream branch).

The hybrid trie structure of the present invention enables fast and accurate routing of Internet data packets, because the look-up process is shortened to merely L levels (stages) by the use of hybrid trie units, i.e., the critical path is significantly shortened. In addition, the look-up process is not complicated so as to require complicated software and does not present a computational burden on the processors in Internet routers. Thus, the address lookup engine of the present invention is suitable for very high-speed Internet network routing. For example, Internet routers embodying the hybrid trie structure of the present invention is capable of 250 million lookups per second with a 250 MHz clock rate. The design of the hybrid trie is not complicated and is very highly pipelined, thus being suitable for high-density integrated circuit design. In addition, Internet routers embodying the hybrid trie structure of the present invention would consume only a small amount of power because the lookup process does not require complicated software processing compared with traditional longest match trie approaches.

What is claimed is:

1. A method of searching for a longest prefix match for an address having a number of binary bits among a plurality of entries having different lengths of bits, the entries being associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers, each of the plurality of entries corresponding to one trie node, at least one trie node for L-bit trie match pointing to the first trie unit, and each trie node corresponding to a first, second, third, or fourth type of trie node, the method comprising;
  splitting the address into at least a first key and a second key, each key including a predetermined number of address bits;
  determining a first matching node among the first number of trie nodes based on the address bits in the first key;
  responsive to the first matching node corresponding to the first or second trie node type, selecting the entry corresponding to the first matching node as the longest prefix match for the address;
  responsive to the first matching node corresponding to the third or fourth trie node type, determining at least one second matching node in the first trie unit based upon the address bits in the second key.

2. The method of claim 1, wherein the trie further includes at least a second trie unit and the address is further split into at least a third key, the method further comprising:
  determining the trie node type of the second matching node;
  responsive to the second matching node corresponding to the first or second trie node type, selecting the entry corresponding to the second matching node as the longest prefix match for the address; and
  responsive to the second matching node corresponding to the third or fourth trie node type, determining a third matching node in the second trie unit based upon the address bits in the third key.

3. The method of claim 1, wherein the first trie node type is a free node, the second trie node type is a leaf node, the third trie node type is a path node, the fourth trie node type is a path-leaf node.

4. The method of claim 1, wherein the address is an Internet address included in an Internet data packet and the entries include prefixes each associated with a destination port in an Internet router.

5. The method of claim 4, wherein selecting the entry corresponding to the first matching node as the longest prefix match comprises selecting the destination port associated with the first matching node as the destination port for the Internet data packet.

6. A system for searching for a longest prefix match for an address having a number of binary bits among a plurality of entries having different lengths of bits, the entries being associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers, each of the plurality of entries corresponding to one trie node, at least one trie node for L-bit trie match pointing to a trie unit, and each trie node corresponding to a first, second, third, or fourth type of trie node, the system comprising:
  at least a first memory unit storing the first number of trie nodes;
  at least a second memory unit coupled to the first memory unit and storing the first trie unit; and
  at least a match decoder coupled to the second memory subunit and configured to match respective bits of the address with respective trie nodes in the trie unit stored in the second memory unit.

7. The system of claim 6, wherein the address is split into at least a first key and a second key, each key including a predetermined number of bits, and the bits in the first key is used as an index to find a first matching trie node in the first memory unit.

8. The system of claim 7, wherein the match decoder comprises:
  a plurality of multiplexers, each multiplexer determining at least one second matching trie node based upon the bits in the second key; and
  a selection logic module coupled to the plurality of multiplexers and selecting one trie node among the second matching trie node upon determining that the second matching trie node is a second node type.

9. The system of claim 8, wherein the first trie node type is a free node, the second trie node type is a leaf node, the third trie node type is a path node, the fourth trie node type is a path-leaf node, and the selection logic module receives the trie node types of the respective second matching trie nodes from respective multiplexers and selects the one trie node among the second matching trie nodes based on the received trie node types.

10. The system of claim 8, wherein the match decoder further comprises a selection multiplexer coupled to the plurality of multiplexers and to the selection logic module, the selection multiplexer receiving an output from each of the plurality of multiplexers and selecting one output among the outputs from the plurality of multiplexers based upon the determination of the selection logic module that the second matching trie node is a second node type.

11. A computer-readable medium storing a plurality of entries having different lengths of bits, one of the entries corresponding to a longest prefix match for an address having a number of binary bits, the entries being associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers, each of the plurality of entries corresponding to one trie node, at least one trie node for L-bit trie match pointing to a trie unit, and each trie node corresponding to a first, second, third, or fourth type of trie node.

12. The computer-readable medium of claim 11, wherein the first trie node type is a free node, the second trie node type is a leaf node, the third trie node type is a path node, the fourth trie node type is a path-leaf node.

13. The computer-readable medium of claim 11, wherein the address is an Internet address included in an Internet data packet and the entries include prefixes each associated with a destination port in an Internet router.

14. A method of inserting an entry having a destination pointer into a trie node in a trie used for a longest prefix match of an address having a number of binary bits, the trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers and $K_1$ is smaller than $K_2$, at least one trie node for L-bit trie match pointing to the first trie unit, and each trie node being one of a free node, a leaf node, a path node, and a path-leaf node, the method comprising;
receiving an insertion address;
splitting the insertion address into at least a first key and a second key, each key including a predetermined number of address bits;
determining a first matching node among the first number of trie nodes based on the address bits in the first key, the first matching node being the matching node for the L-bit trie match;
determining the node type of the first matching node;
responsive to the first matching node being a free node, changing the first matching node to a leaf node and assigning the destination pointer to the first matching node;
responsive to the first matching node being a leaf node, assigning the destination pointer to the first matching node;
responsive to the first matching node being a path node, changing the first matching node to a path-leaf node and updating free nodes downstream the first matching node with the destination pointer;
responsive to the first matching node being a path-leaf node, updating free nodes downstream the first matching node with the destination pointer.

15. The method of claim 14, further comprising:
determining the node type of the L-bit trie node matching the first L bits of the address;
responsive to the node type of the L-bit trie node being a free node, changing the L-bit trie node to a path node;
responsive to the node type of the L-bit trie node being a leaf node, changing the L-bit trie node to a path-leaf node;
determining a second matching node in the first trie unit based upon the address bits in the second key, the second matching node being the matching node for the $K_2$-bit match;
updating $K_1$-bit trie nodes in the first trie unit; and
updating the second matching node.

16. The method of claim 15, wherein updating the $K_1$-bit trie nodes in the first trie unit comprises:
determining the node type of the $K_1$-bit trie nodes;
responsive to the node type of the $K_1$-bit trie nodes being a free node, changing the $K_1$-bit trie nodes to a path node; and
responsive to the node type of the $K_1$-bit trie nodes being a leaf node, changing the $K_1$-bit trie nodes to a path-leaf node.

17. The method of claim 15, wherein updating the second matching node comprises:
determining the node type of the second matching node;
responsive to the node type of the second matching node being a free node, changing the second matching node to a leaf node and assigning the destination pointer to the second matching node;
responsive to the node type of the second matching node being a leaf node, assigning the destination pointer to the second matching node;
responsive to the node type of the second matching node being a path node, changing the second matching node to a path-leaf node and updating free nodes downstream the second matching node with the destination pointer; and
responsive to the node type of the second matching node being a path-leaf node, updating free nodes downstream the second matching node with the destination pointer.

18. A method of deleting an entry from a trie node in a trie used for a longest prefix match of an address having a number of binary bits, the trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers and $K_1$ is smaller than $K_2$, at least one trie node for L-bit trie match pointing to the first trie unit, and each trie node being one of a free node, a leaf node, a path node, and a path-leaf node, the method comprising;
receiving a deletion address;
splitting the deletion address into at least a first key and a second key, each key including a predetermined number of address bits;
determining a first matching node among the first number of trie nodes based on the address bits in the first key, the first matching node being the matching node for the L-bit trie match;
determining the node type of the first matching node;
responsive to the first matching node being a leaf node, changing the first matching node to a free node and assigning a free pointer to the first matching node; and responsive to the first matching node being a path-leaf node, changing the first matching node to a path node and updating free nodes downstream the first matching node with the free pointer.

19. The method of claim 18, further comprising:

determining a second matching node in the first trie unit based upon the address bits in the second key, the second matching node being the matching node for the $K_2$-bit match;

determining the node type of the second matching node;

responsive to the node type of the second matching node being a leaf node, changing the second matching node to a free node and assigning a first free pointer to the second matching node; and responsive to the node type of the second matching node being a path-leaf node, changing the second matching node to a path node and updating free nodes downstream the second matching node with the free pointer.

20. A system for controlling insertion and deletion of entries in a trie storing a plurality of entries, one of the entries corresponding to a longest prefix match for an address having a number of binary bits, the trie including at least a first stage having a first number of trie nodes for L-bit trie match, wherein L is a predetermined integer greater than 1, and at least a second stage having at least a first trie unit including at least one trie node for $K_1$-bit trie match and at least one trie node for $K_2$-bit trie match, wherein $K_1$ and $K_2$ are two different positive integers, each of the entries corresponding to one trie node, at least one trie node for L-bit trie match pointing to a trie unit, the system comprising:

a command processor receiving input data including a prefix operation command, a prefix address, a prefix length, and a destination pointer for controlling the insertion and deletion of entries in the trie based upon the received input data;

a first memory coupled to the command processor for storing a link table having next stage pointer information for each stage in the trie;

a second memory coupled to the command processor for storing a command stack table having pointer information used in stack processing; and a third memory coupled to the command processor for storing a path stack table having pointer information used in path processing.

21. A system for controlling insertion and deletion of entries in a trie storing a plurality of entries, one of the entries corresponding to a longest prefix match for an address having a number of binary bits, the trie including at least a first stage having a first number of trie nodes for L-bit trie match, wherein L is a predetermined integer greater than 1, and at least a second stage having at least a first trie unit including at least one trie node for $K_1$-bit trie match and at least one trie node for $K_2$-bit trie match, wherein $K_1$ and $K_2$ are two different positive integers, each of the entries corresponding to one trie node, at least one trie node for L-bit trie match pointing to a trie unit, the system comprising:

processor means for receiving input data including a prefix operation command, a prefix address, a prefix length, and a destination pointer and for controlling the insertion and deletion of entries in the trie based upon the received input data;

first memory means coupled to the processor means for storing a link table having next stage pointer information for each stage in the trie;

second memory means coupled to the processor means for storing a command stack table having pointer information used in stack processing; and third memory means coupled to the processor means for storing a path stack table having pointer information used in path processing.

22. A system for searching for a longest prefix match for an address having a number of binary bits among a plurality of entries having different lengths of bits, the entries being associated with a trie having a first number of trie nodes for L-bit trie match, wherein L is a predetermined integer greater than 1, and at least a first trie unit including at least one trie node for $K_1$-bit trie match and at least one trie node for $K_2$-bit trie match, wherein $K_1$ and $K_2$ are two different positive integers, each of the plurality of entries corresponding to one trie node, at least one trie node for L-bit trie match pointing to a trie unit, and each trie node corresponding to a first, second, third, or fourth type of trie node, the system comprising:

at least a first memory means for storing the first number of trie nodes;

at least a second memory means coupled to the first memory means for storing the first trie unit; and at least a decoder means coupled to the second memory means for matching respective bits of the address with respective trie nodes in the trie unit stored in the second memory means.

* * * * *